United States Patent
Dusha

(10) Patent No.: US 10,704,233 B2
(45) Date of Patent: Jul. 7, 2020

(54) DYNAMIC MOTION COMPENSATION

(71) Applicant: LEICA GEOSYSTEMS AG, Heerbrugg (CH)

(72) Inventor: Damien Dusha, Dutton Park (AU)

(73) Assignee: LEICA GEOSYSTEMS AG, Heerbrugg (CH)

( * ) Notice: Subject to any disclaimer, the term of this patent is extended or adjusted under 35 U.S.C. 154(b) by 0 days.

(21) Appl. No.: 15/566,328

(22) PCT Filed: Apr. 13, 2016

(86) PCT No.: PCT/AU2016/050270
§ 371 (c)(1),
(2) Date: Oct. 13, 2017

(87) PCT Pub. No.: WO2016/164975
PCT Pub. Date: Oct. 20, 2016

(65) Prior Publication Data
US 2018/0298593 A1   Oct. 18, 2018

(30) Foreign Application Priority Data

Apr. 13, 2015  (AU) .................... 2015901311

(51) Int. Cl.
*G01C 9/08* (2006.01)
*E02F 9/26* (2006.01)
(Continued)

(52) U.S. Cl.
CPC ............... *E02F 9/268* (2013.01); *E02F 3/32* (2013.01); *E02F 3/431* (2013.01); *E02F 3/435* (2013.01);
(Continued)

(58) Field of Classification Search
CPC ...... E02F 3/43; E02F 3/32; E02F 9/26; G01B 7/14; G01B 21/04; G01C 9/08; G01C 18/54
(Continued)

(56) References Cited

U.S. PATENT DOCUMENTS 6,253,160 B1 * 6/2001 Hanseder ............... E02F 3/435
342/357.27
7,457,698 B2 * 11/2008 Danko ................... B25J 9/1607
701/50
(Continued)

FOREIGN PATENT DOCUMENTS

CN  103899338 A   7/2014
EP    2511677 A1  10/2012
EP  2 586 918 A2   5/2013

OTHER PUBLICATIONS

European Search Report dated Nov. 23, 2018 as received in Application No. 16779335.5.
(Continued)

Primary Examiner — Tan Q Nguyen
(74) Attorney, Agent, or Firm — Maschoff Brennan

(57) ABSTRACT

A method and system that compensates for kinematic accelerations influencing a sensor measurement of working equipment such as an excavator. The method and system identify members of the working equipment that are movable relative to each other (e.g. stick, boom, bucket) and define a co-ordinate frame for each movable member. A kinematic relationship, preferably a kinematic chain. The sensor measurement is then modified according to the kinematic relationships and the relative position of each identified member.

16 Claims, 8 Drawing Sheets

(51) Int. Cl.
*E02F 3/32* (2006.01)
*E02F 3/43* (2006.01)
*G01C 19/00* (2013.01)
*G01B 21/04* (2006.01)
*G01B 7/14* (2006.01)

(52) U.S. Cl.
CPC ............ *E02F 9/264* (2013.01); *G01B 21/045* (2013.01); *G01C 9/08* (2013.01); *G01C 19/00* (2013.01)

(58) Field of Classification Search
USPC .......................................................... 701/36
See application file for complete search history.

(56) References Cited

U.S. PATENT DOCUMENTS

| | | | | |
|---|---|---|---|---|
| 9,151,013 | B2* | 10/2015 | Glitza | E02F 3/435 |
| 9,279,235 | B1* | 3/2016 | Becicka | E02F 9/2029 |
| 9,540,794 | B2* | 1/2017 | Iwamura | E02F 9/2004 |
| 9,617,708 | B2* | 4/2017 | Naik | E02F 3/32 |
| 9,618,338 | B2* | 4/2017 | Fehr | G01C 9/08 |
| 10,002,469 | B2* | 6/2018 | Yeh | G06F 17/30241 |
| 10,017,914 | B1* | 7/2018 | Howell | E02F 3/435 |
| 2009/0082930 | A1 | 3/2009 | Peters | |
| 2009/0204259 | A1* | 8/2009 | Danko | G05B 13/024 |
| | | | | 700/250 |
| 2009/0312974 | A1* | 12/2009 | Douglas | G01C 21/16 |
| | | | | 702/93 |
| 2011/0085859 | A1 | 4/2011 | Yost | |
| 2012/0099955 | A1 | 4/2012 | Glitza | |
| 2012/0239331 | A1 | 9/2012 | Bageshwar et al. | |
| 2013/0080112 | A1 | 3/2013 | Friend | |

OTHER PUBLICATIONS

CN Office Action in application No. 201680021501.5 dated Sep. 2, 2019.

CN Search Report in application No. 201680021501.5 dated Sep. 2, 2019.

* cited by examiner

DYNAMIC MOTION COMPENSATION

FIELD OF THE INVENTION

The invention relates to dynamic motion compensation. In particular, the invention relates, but is not limited, to compensating sensor measurements, such as inclinometer measurements, for unwanted variances due to dynamic movements such as, for example, when a vehicle or portions of a vehicle are moving.

BACKGROUND TO THE INVENTION

Reference to background art herein is not to be construed as an admission that such art constitutes common general knowledge.

Precision machine guidance is becoming increasingly common in many industries, primarily due to productivity improvements that can be obtained with the assistance of accurate machine control systems. In civil construction and mining machinery such as excavators, dozers, and graders can all benefit from precision machine guidance and control.

Machines equipped with precision guidance require drastically reduced interaction with surveyors on site, as the precision guidance equipment is able to compute the position of a working edge (e.g. of an excavator bucket or a dozer blade) with respect to a reference, such as a string line. Where the machine is also equipped with a precision positioning system such as a Global Navigation Satellite Systems (GNSS) Real Time Kinematic (RTK) system, or an optical instrument such as a total station, the need for a surveyor working on site is reduced significantly or, in some cases, able to be eliminated entirely.

Real-time feedback of the position of the working edge also allows an operator of a machine to be more efficient through fast identification of material to be moved (e.g. cut or filled) and in reducing re-work required to obtain a desired outcome. Even more advanced applications that rely on precise and timely positioning include semi-automatic or fully automatic control of the working equipment, which further enhances the speed at which the machines can work and reduces the training and experience required by an operator to control the machinery.

Civil construction and mining sites often require centimeter, or even millimeter, precision. Such high precision needs directly impacts the performance requirements of guidance equipment and constant improvements are sought to increase accuracy at a reasonable cost.

Many successful machine guidance solutions on the market, such as the Leica Geosystems iCON Excavate iXE3 system, consists of inclinometers or accelerometers mounted to movable members of a machine, such as an arm of an excavator having a boom, stick, and bucket. The inclinometers measure a local gravity vector in the coordinate frame of the member to which it is attached, and thus it is possible to calculate the angle of that member with respect to a vertical axis. Knowledge of the angle of each movable member, together with the position and orientation (pitch, roll, and heading) of the chassis and the geometry of the machine allow the position of a working edge (e.g. the lip of an excavator bucket) to be calculated.

Current systems typically have good static performance, i.e. determining a position when there is no movement, but very poor dynamic performance, i.e. determining a position when there is movement. In typical usage, an operator has to pause periodically to allow the equipment to stabilise in order to get an accurate position measurement. Depending on the action being undertaken, several pauses may be needed. Such periods of inactivity obviously reduce efficiency as they reduce the amount of time for which equipment can be working.

While direct measurement of member positions may be measured using, for example, rotary or angle encoders or the like, such sensors are difficult to retrofit to a machine and are subject to maintenance and calibration. Accordingly, such direct measurement systems are usually not practical or commercially viable for after-market guidance systems and most systems therefore rely on inclinometers for angular measurements.

The root cause of the poor dynamic performance of an inclinometer-based measurement system is due to measurements of a gravity vector being corrupted by accelerations, shocks, and vibration caused by the movement of the machine and its movable members.

This effect is observed in the aerospace industry where a manoeuvring aircraft can induce significant errors into a measurement of the gravity vector. The solution adopted by the aerospace industry is to utilise gyroscopes, which measure the rate of change of angle with time, whose measurements are accumulated to track the angle. Since the accumulation of gyro measurements will also accumulate errors, the calculated angle is slowly steered to the measurements of the gravity vector. This complementary arrangement of sensors is known as an Attitude and Heading Reference System (AHRS).

The recognition that gyroscope measurements can help improve the dynamic performance of a machine guidance solution is slowly finding its way into products on the market. Whilst the inclusion of the gyros improves the performance of inclinometers, merely smoothing variations in the gravity vector offers suboptimal performance. That is, the accuracy of the solution is still limited by the quality of inclinometers and the associated measurement of the gravity vector, since the accumulated noise, bias, and other sensor errors from the gyroscopes eventually cause the angle to drift. Even with perfect inclinometer measurements, induced accelerations caused by movement will ultimately limit the performance of such a system.

It is therefore desirable to understand the cause and effect of accelerations induced on inclinometer measurements. If the induced accelerations can be identified, quantified, and observed, then the measurements of the gravity vector can be duly compensated.

OBJECT OF THE INVENTION

It is an aim of this invention to provide dynamic motion compensation which overcomes or ameliorates one or more of the disadvantages or problems described above, or which at least provides a useful alternative.

Other preferred objects of the present invention will become apparent from the following description.

SUMMARY OF INVENTION

In one form, although it need not be the only or indeed the broadest form, there is provided a method of providing compensation for kinematic accelerations influencing a sensor measurement of working equipment, the method comprising:

identifying one or more members of the working equipment that are movable relative to each other;

defining a co-ordinate frame for each movable member;

determining kinematic relationships for each co-ordinate frame;

determining the relative position of each identified member;

modifying the sensor or sensor measurement according to the kinematic relationships and relative position of each identified member.

Preferably, the step of determining the relative position of each identified member comprises determining the angle of each identified member. Preferably, the step of modifying the sensor or sensor measurement further comprises modifying the sensor or sensor measurement according to at least one of the group of measured: linear acceleration, angular rate, or angular acceleration.

Preferably the step of determining kinematic relationships for each co-ordinate frame comprises determining a kinematic chain. Preferably the step of determining a kinematic chain comprises successively determining kinematic relationships from a first movable member to a final movable member. Preferably the kinematic relationship for subsequent movable members is dependent upon the kinematic relationship of a previous movable member.

Preferably, the step of determining a kinematic chain comprises determining kinematic relationships between a set of mechanically coupled linkages wherein each linkage is connected to a plurality of adjacent linkages.

Preferably the step of modifying the sensor or sensor measurement according to the kinematic relationships and relative position of each identified member comprises utilising a time derivative of the relative position of each identified member. Preferably, utilising a time derivative of the relative position of each identified member comprises utilising at least one second or higher time derivative.

Preferably the sensor measurement is a measurement from an inclinometer sensor. The inclinometer sensor may be an accelerometer sensor. Alternatively, the inclinometer sensor may be a sensor that measures one or more angles with respect to a local vertical. Preferably the co-ordinate frames are Cartesian co-ordinate frames. Preferably the co-ordinate frames have three dimensions, preferably a Cartesian co-ordinate frame having three orthogonal axes.

Preferably the step of modifying the sensor or sensor measurement comprises compensating for one or more of linear acceleration, acceleration with respect to a rotating frame, and fictitious forces. Preferably the fictitious forces comprise one or more of centrifugal acceleration, Coriolis acceleration, and Euler acceleration. Preferably, the step of modifying the sensor or sensor measurement comprises using measurements from one or more angular rate sensors or one or more angular acceleration sensors. The step of modifying the sensor or sensor measurement may comprise using measurements from a plurality of sensors attached to spatially diverse locations on a movable member The step of defining a co-ordinate frame for each movable member may comprise the step of defining a co-ordinate frame for one or more sensors associated with the movable members. The step of modifying the sensor or sensor measurement according to the kinematic relationships and relative position of each identified member may further comprise modifying the sensor or sensor measurement according to the one or more sensors associated with the movable member and the co-ordinate frame for the one or more sensors associated with the movable members.

Preferably the method further comprises the step of determining a displacement between the co-ordinate frame of a movable member and the co-ordinate frame of a sensor of the movable member. Preferably the method further comprises the step of determining an angular offset between axes of the co-ordinate frame of a movable member and the co-ordinate frame of a sensor for, preferably attached to, the movable member.

The step of defining a co-ordinate frame for each movable member preferably comprises defining a co-ordinate frame for a joint associated with the movable member. The step of determining the relative position of each identified member may further comprise determining an angle of each joint between movable members.

Preferably the step of determining kinematic relationships for each co-ordinate frame comprises successively determining kinematic relationships from a first movable member to a final movable member.

The sensor may be located on the chassis. The method preferably further comprises defining a co-ordinate frame for a chassis of the working equipment.

Preferably the method further comprises determining a position of a working edge. Preferably the step of determining a position of a working edge comprises using the modified sensor measurement to determine the position of the working edge. Preferably the step of determining a position of the working edge comprises determining angles between adjacent movable members. Preferably determining angles between adjacent movable members comprises accounting for kinematic effects. Determining angles between adjacent movable members may comprise using a coarse levelling algorithm and accounting for kinematic effects.

Preferably determining angles between adjacent movable members comprises using an attitude and heading reference system (AHRS) and accounting for kinematic effects. Preferably the step of using an AHRS comprises using a recursive estimation technique. Preferably the step of using an AHRS comprises using one of the families of complementary filters, Kalman filters, Extended Kalman Filters, Sigma-point Kalman filters, Ensemble Kalman filters, and particle filters. Accounting for kinematic effects may comprise compensating sensor measurements for kinematic accelerations. Accounting for kinematic effects may comprise ignoring sensor measurements when appreciable kinematic accelerations are determined to be over a predetermined level.

According to another form, there is provided a system that compensates one or more sensor measurement of working equipment for kinematic accelerations, the system comprising:

working equipment having one or more members that are movable relative to each other; and a processor in communication with the sensor that is configured to:

take a sensor measurement;

obtain a co-ordinate frame for each movable member;

obtain a kinematic relationship for each co-ordinate frame;

determine the relative position of the movable members; and modify the sensor or sensor measurement according to the kinematic relationships and relative position of each identified member to account for the kinematic accelerations.

Preferably, the sensor comprises one or more sensors mounted to one or more of the plurality of members that are movable relative to each other. Preferably, determining the relative position of the movable members comprises determining the angle of each identified member. Preferably, the processor is further configured to determine at least one of the group of measured: linear acceleration, angular rate, or angular acceleration; and to modify the sensor or sensor measurement using the determined linear acceleration, angular rate, and/or angular acceleration.

Preferably the working equipment comprises a chassis and the sensor is located on the chassis. Preferably the processor is located on the working equipment. Preferably the processor comprises an embedded system. Preferably the embedded system comprises a microcontroller.

Preferably the processor is configured to obtain a stored co-ordinate frame for each movable member. Preferably the processor is configured to obtain a stored kinematic relationship for each co-ordinate frame.

Preferably, the working equipment is a construction vehicle, agriculture vehicle or mining vehicle. Even more preferably, the vehicle is one of excavator, dozer, grader, loader, snow groomer, dragline, tractor, backhoe, harvester, crane, drill or shovel. Preferably the working equipment is an excavator and preferably the one or more movable members comprise a boom, stick, and/or bucket.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
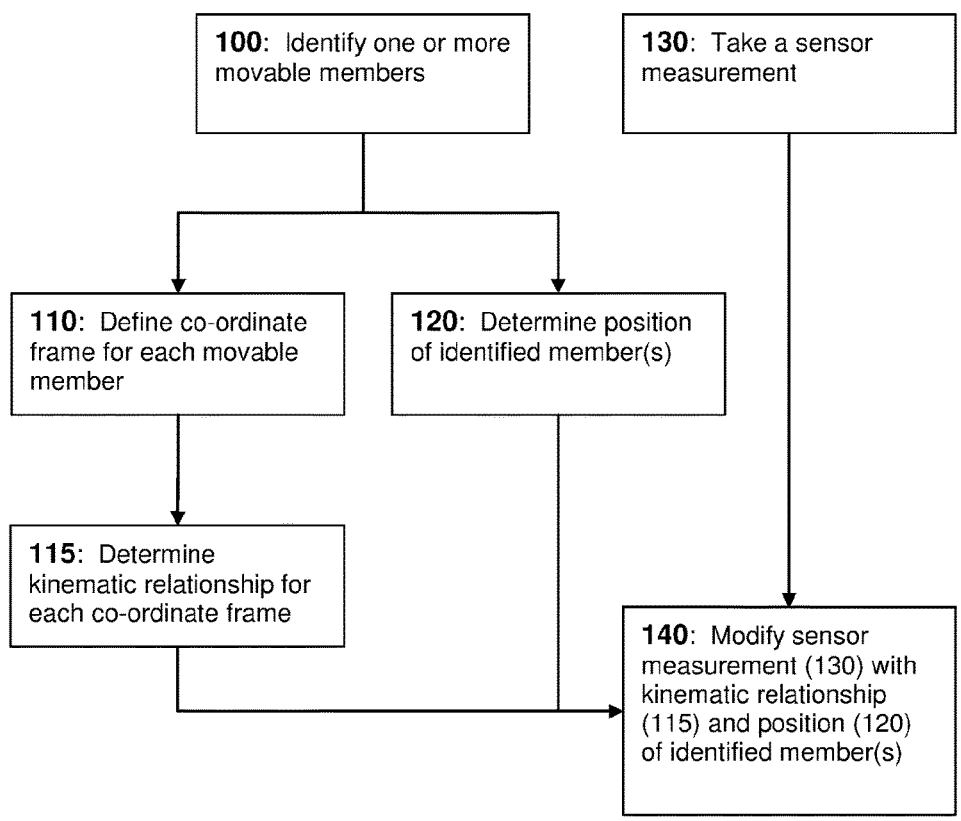
FIG. 1 illustrates a high level flow chart illustrating a method of compensating a sensor measurement for kinematic accelerations.

FIG. 1 illustrates a flow chart of a method of compensating a sensor measurement, preferably an inclinometer or accelerometer measurement, for local kinematic accelerations such as movements of working equipment affecting the sensor measurement. The method is particularly relevant to working equipment with independently movable members, such as an excavator 10 as illustrated in FIGS. 2 to 13. The invention is primarily described with reference to an excavator 10 but, where the context permits, no limitation is meant thereby and it will be appreciated that the invention could also be applied to other types of equipment and vehicles, such as dozers, graders, front-end loaders, snow groomers, drills or backhoes that have sensors that are influenced by kinematic accelerations such as movements.

Figure 2:
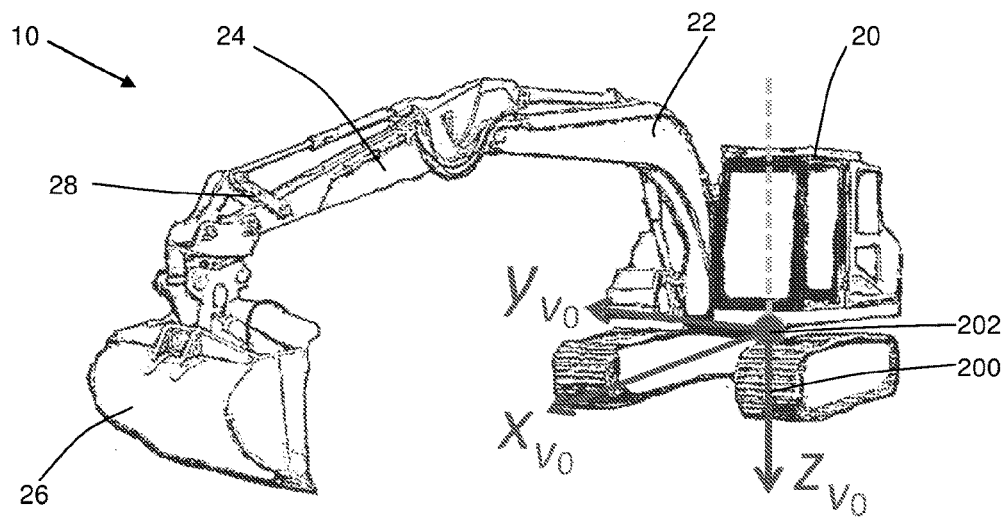
FIG. 2 illustrates an example excavator showing a chassis co-ordinate frame.

In overview, one or more movable members are identified (step 100). Typically the members are independently movable members such as a boom 22, stick 24, and bucket 26 of excavator 10 illustrated in FIG. 2. The boom 22, stick 24, and bucket 26 of excavator 10 illustrated in FIG. 2 are all movable relative to a chassis 20 and to each other. The bucket 26 is connected to the stick 24 via an implement joint 302.

Once identified, a co-ordinate frame is defined for each member (step 110) and a kinematic relationship for each co-ordinate frame is determined (step 115). The relative position of each member is also determined (step 120). A sensor measurement (step 130) can then be modified (step 140) using kinematic relationship (from step 115) and position data (from step 120) to compensate for kinematic accelerations created by those members.

The position data preferably includes location data, angular data, and time derivatives thereof (e.g. angular rate and acceleration). Angular rate (i.e. the first time derivative of angle) can be used to compensate for centripetal acceleration, angular rate and velocity (both time derivatives) can be used to compensate for Coriolis acceleration, linear acceleration (i.e. the second time derivative of position) can be used in kinematic compensation, and angular acceleration (i.e. the second time derivative of angle) can be used to compensate for Euler acceleration. These kinematic effects can be selectively compensated for depending on the available data, computational power, and desired accuracy of the system. Alternatively, if the kinematic accelerations are determined to be over a predetermined level, e.g. when they are considered to be large enough to adversely affect the accuracy of the system, then the sensor measurements may simply be ignored during this time.

The overall process will now be described in further detail in relation to the excavator 10 illustrated in FIGS. 2 to 13.

FIG. 2 illustrates an excavator 10 having movable members in the form of a boom 22, stick 24, and bucket 26 that are each independently movable relative to a chassis 20 and each other. The boom 22, stick 24, and bucket 26 can be defined by an open chain kinematic relationship. Once the kinematic relationships between the movable members 22, 24, and 26 and chassis 20 are understood, they can be related to observables (i.e. measurements from inertial sensors, or the like).

To establish the various kinematics relationships, the general kinematics of rotating frames are derived. This general relationship is then applied to each movable member and its joints which, in relation to the excavator 10, is in relation to the boom 22, stick 24, and bucket 26 and the joints therebetween. Once the kinematic relationships are established, several sensor measurement modification strategies are considered to take advantage of the defined relationships, with preferred strategies typically being selected to balance performance against available computational resources.

Since accelerometers and gyroscopes measure with respect to inertial space, an expression for the general kinematics of rotating frames is of interest in order to model the true acceleration being induced on the sensor. Consider a generic coordinate b-frame, which is rotating with respect to another generic a-frame. The position of the b-frame with respect to the a-frame resolved in the a-frame is denoted $r_{ab}^a$. Consider now a point c in space, which may be written with respect to the b-frame as $r_{bc}^b$.

Point c with respect to the a-frame is given by:

$$r_{ac}^a = r_{ab}^a + r_{bc}^a$$

When resolving point c in the b-frame, the expression is:

$$r_{ac}^a = r_{ab}^a + R_b^a r_{bc}^b$$

Differentiating with respect to time yields velocity:

$$\dot{r}_{ac}^a = \dot{r}_{ab}^a + \dot{R}_b^a r_{bc}^b + R_b^a \dot{r}_{bc}^b$$

Introducing the rotation differential equation:

$$\dot{R}_b^a = R_b^a [\omega_{ab}^b]_x$$

Substituting yields velocity:

$$\dot{r}_{ac}^a = \dot{r}_{ab}^a + R_b^a [\omega_{ab}^b]_x r_{bc}^b + R_b^a \dot{r}_{bc}^b$$
$$= \dot{r}_{ab}^a + R_b^a ([\omega_{ab}^b]_x r_{bc}^b + \dot{r}_{bc}^b)$$

Differentiating velocity with respect to time yields acceleration:

$$\ddot{r}_{ac}^a = \ddot{r}_{ab}^a + \dot{R}_b^a ([\omega_{ab}^b]_x r_{bc}^b + \dot{r}_{bc}^b) + R_b^a ([\dot{\omega}_{ab}^b]_x r_{bc}^b + [\omega_{ab}^b]_x \dot{r}_{bc}^b + \ddot{r}_{bc}^b)$$

Substituting for the rotation differential equation and rearranging yields:

$$\ddot{r}_{ac}^a = \ddot{r}_{ab}^a + R_b^a ([\omega_{ab}^b]_x)^2 r_{bc}^b + 2R_b^a [\omega_{ab}^b]_x \dot{r}_{bc}^b + R_b^a [\dot{\omega}_{ab}^b]_x r_{bc}^b + R_b^a \ddot{r}_{bc}^b$$

These terms may be identified as:
$\ddot{r}_{ab}^a$ being acceleration of the frame itself;
$R_b^a \ddot{r}_{bc}^b$ being acceleration with respect to the rotating frame;
$R_b^a ([\omega_{ab}^b]_x)^2 r_{bc}^b$ being 'fictitious' centrifugal acceleration;
$2R_b^a [\omega_{ab}^b]_x \dot{r}_{bc}^b$ being 'fictitious' Coriolis acceleration; and
$R_b^a [\dot{\omega}_{ab}^b]_x r_{bc}^b$ being 'fictitious' Euler accelerations.

The 'fictitious' centrifugal, Coriolis, and Euler accelerations arise from the kinematic motion of the excavator 10. With known locations of the movable members, velocity, acceleration, angular velocity, and angular acceleration, these additional kinematic accelerations, which typically corrupt inclinometer measurements, may be accounted for using kinematic relationships as follows.

As the Earth is a rotating reference frame inertial sensors typically measure not only true inertial acceleration, but also effects introduced by the choice of navigation frame. Since a purely inertial frame of reference is impractical for terrestrial activities, one must examine the effects of using an Earth-based reference frame, such as a Local Geodetic frame (i.e. local vertical) or an Earth-Centred, Earth-Fixed (ECEF) reference frame.

Attitude can be tracked with respect to a local navigation frame for easy interpretation due to aligning the z-axis with local gravity. However, as gyroscopes measure angular rate with respect to inertial space (i.e. not the local navigation frame) a relationship with respect to the local geodetic frame should be considered.

Starting with the Rotation Differential Equation of the body with respect to the local navigation frame:

$$R_b^n = R_b^n [\omega_{nb}^b]_x$$

We must derive some relationship between the angular rate $\omega_{nb}^b$ of the body with respect to the local navigation frame and the gyroscope measurement with respect to inertial space $\omega_{ib}^b$. This may be accomplished using:

$$\omega_{nb}^b = \omega_{ib}^b - \omega_{ie}^b - \omega_{en}^b$$
$$= \omega_{ib}^b - R_n^b R_e^n \omega_{ie}^e - R_n^b \omega_{en}^n$$

For navigation in a Local Geodetic (LG) frame, three terms should be considered: gyro measurements $\omega_{ib}^b$, the contribution due to the Earth's rotation $R_n^b R_e^n \omega_{ie}^e$, and rotation of the LG frame with respect to an ECEF frame ('transport rate') $R_n^b \omega_{en}^n$.

The Earth has a rotation rate of approximately 15 deg/hr. Since recent industrial-grade MEMS gyroscopes have a bias stability in the order of 10 deg/hr, ignoring this term is a suboptimal use of the sensors.

The transport rate term, which may be calculated based on the current position and velocity of equipment as:

$$\omega_{en}^n = \begin{bmatrix} \dfrac{\dot{r}_{eb,E}^n}{R_E(L)+h} \\ -\dfrac{\dot{r}_{eb,N}^n}{R_N(L)+h} \\ -\dfrac{\dot{r}_{eb,E}^n \tan(L)}{R_E(L)+h} \end{bmatrix}$$

The terms $R_E(L)$, $R_N(L)$ and $h$ are the transverse radius of curvature as a function of latitude, geocentric radius as a function of latitude, and height above the ellipsoid, respectively. The subscripts N, E, and D are the north, east and down components of the velocity respectively.

From this equation, a machine moving at 30 km/hr would experience a transport rate of 0.27°/hr. A slowly moving machine at 5 km/hr, which is typical of high precision operations, would experience a transport rate of less than 0.05°/hr. Both of these values are below the resolvability of current generation industrial MEMS and therefore may be safely ignored.

In a similar manner to gyroscopes, the fact that the LG frame is not an inertial frame will result in inclinometers measuring accelerations that arise for reasons other than gravitational acceleration. General kinematics of rotating frames may be applied to determine the extent of such an effect:

$$\ddot{r}_{ib}^i = \ddot{r}_{in}^i + R_n^i ([\omega_{in}^n]_x)^2 r_{nb}^n + 2R_n^i [\omega_{in}^n]_x \dot{r}_{nb}^n + R_n^i [\dot{\omega}_{in}^n]_x r_{nb}^n + R_n^i \ddot{r}_{nb}^n$$

Since the Earth's rotation rate is constant, at least for navigational purposes, the Euler acceleration term vanishes. Furthermore, since the origin of the navigation frame coincides with the Earth-Centred Inertial frame (ECI), the linear acceleration term also vanishes. Thus, the general kinematics equation reduces down to:

$$\ddot{r}_{nb}^n = R_i^n \ddot{r}_{ib}^i - ([\omega_{in}^n]_x)^2 r_{nb}^n - 2[\omega_{in}^n]_x \dot{r}_{nb}^n$$

The term $R_i^n \ddot{r}_{ib}^i$ describes the acceleration with respect to inertial space rotated into the local navigation frame. The accelerometers will measure this true acceleration, in addition to gravitational acceleration (i.e. the fundamental mass force as a function of position on the earth):

$$R_i^n \ddot{r}_{ib}^i = \ddot{r}_{ib}^n = f_{in}^n + \gamma^n(r_{eb}^n)$$

Substituting into the kinematics equations yields:

$$\ddot{r}_{nb}^n = f_{ib}^n + (\gamma^n(r_{eb}^n) - ([\omega_{in}^n]_x)^2 r_{nb}^n - 2[\omega_{in}^n]_x \dot{r}_{nb}^b$$

The first term is the specific force measured by the accelerometers and rotated into the local navigation frame. The second term contains both gravitational acceleration and acceleration induced by rotation of the Earth. Together they form local gravity as a function of position, $g^n$ ($r_{eb}^n$), which may be calculated using, for example, the Somigliana model. The final term is the Coriolis term due to a change in position of the locally level frame.

If one assumes the maximum speed at which the excavator may travel during tramming is 30 km/h, then the maximum acceleration that could be experienced is 0.12 mg. When making only small manoeuvres whilst working, for example at 5 km/h, then the maximum acceleration is 0.02 mg. Considering that 0.12 mg corresponds to approximately 25 arc-seconds, which is of the same order of magnitude as deflection of the vertical, then it is considered safe to neglect Coriolis acceleration for many machine control applications such as, for example, excavators 10 which typically operate at relatively low speeds.

With inertial quantities identified, coordinate systems for kinematic relationships are next identified. Once the coordinate systems have been identified, kinematic relationships can be applied to each movable member, typically to joints and sensors of the movable members.

With respect to the excavator 10, preferred co-ordinate systems are illustrated in FIGS. 2 to 13. In the illustrated example there is a separate co-ordinate system for each joint (FIGS. 2, 4, 6, 8, 10 and 12) and each sensor associated with a movable member (3, 5, 7, 9, 11 and 13).

Different co-ordinate systems are possible. The example co-ordinate frames have been selected as they align with easily measurable geometric points on the excavator 10. Another system may also be, for example, a system which includes two sensors per movable member in order to directly estimate angular acceleration which in turn can be used to directly compensate for Euler accelerations.

FIG. 2 illustrates a chassis co-ordinate frame 200 having an origin located at an intersection 202 of the axis of rotation and a plane separating an undercarriage of the excavator 10 from a cab of the chassis 20. The chassis co-ordinate frame 200 has: an x-axis that is parallel to, and lies in the direction of, the boom 22; an orthogonal z-axis that is aligned with the axis of rotation, pointing towards the undercarriage; and a y-axis orthogonal to both the x-axis and the z-axis.

Figure 3:
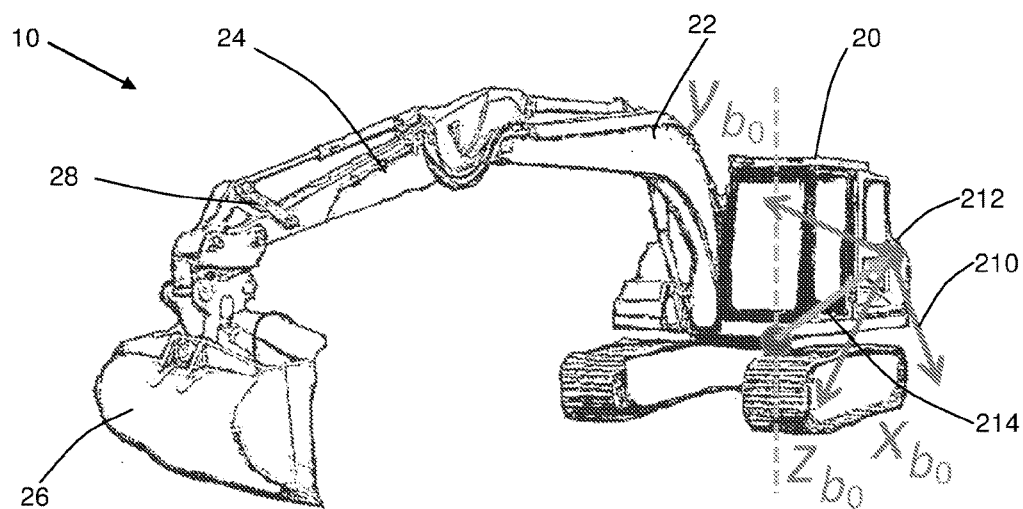
FIG. 3 illustrates an example excavator showing a chassis sensor co-ordinate frame.

FIG. 3 illustrates a chassis sensor co-ordinate frame 210 having an origin located at a centre of navigation of a chassis sensor 212. The chassis sensor 212 has a fixed chassis displacement 214 from the origin of the chassis co-ordinate frame 200. The chassis sensor co-ordinate frame 210 has its axes aligned with sensing axes of the chassis sensor 212 and has a fixed angular offset with respect to the chassis co-ordinate frame 200.

Figure 4:
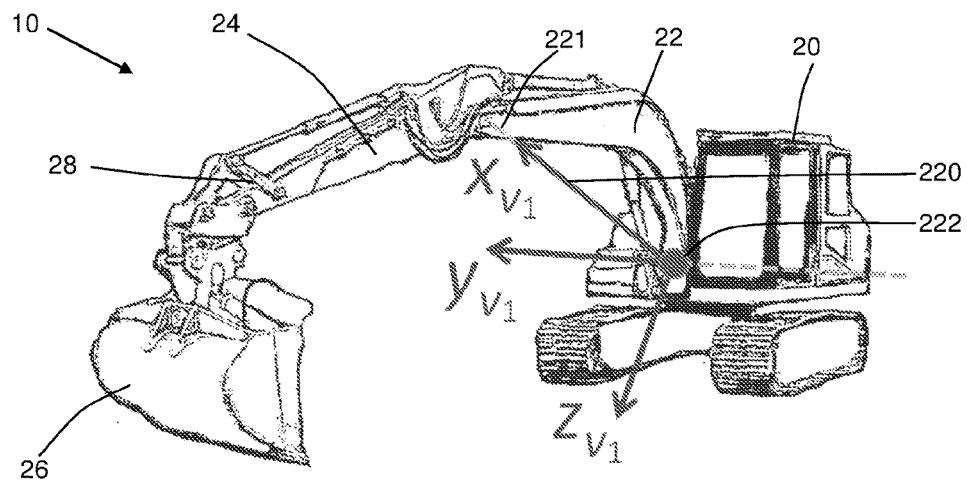
FIG. 4 illustrates an example excavator showing a boom joint co-ordinate frame.

FIG. 4 illustrates a boom joint co-ordinate frame 220 having an origin 222 at an intersection of a rotational axis of the boom joint and a symmetric plane of the boom 22. The boom joint co-ordinate frame 220 has an x-axis that is aligned with a boom reference axis 221 that extends between the boom joint and the stick joint. As the boom joint and stick joint rotational axes are parallel to each other, the boom reference axis 221 is perpendicular to the rotational axes of both the boom joint and stick joint. The boom joint co-ordinate frame 220 also has a y-axis that lies along the boom rotational axis, parallel to and in the same direction as the y-axis of the chassis co-ordinate frame 200, and a z-axis that is orthogonal to both the x-axis and the y-axis.

Figure 5:
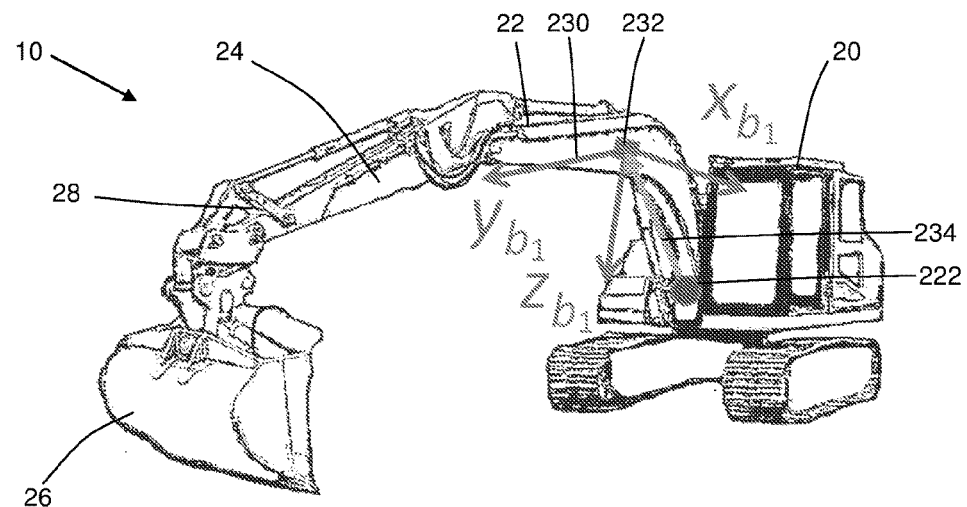
FIG. 5 illustrates an example excavator showing a boom sensor co-ordinate frame.

FIG. 5 illustrates a boom sensor co-ordinate frame 230 having an origin located at the centre of navigation of boom sensor 232 of the boom 22. The boom sensor co-ordinate frame 230 has a fixed boom displacement 234 from the origin of the boom joint co-ordinate frame 222 and a fixed angular offset with respect to the boom joint co-ordinate frame 220. Typically, the y-axis of the boom sensor frame 230 is parallel to and in the same direction as the y-axis of the boom joint co-ordinate frame 220.

Figure 6:
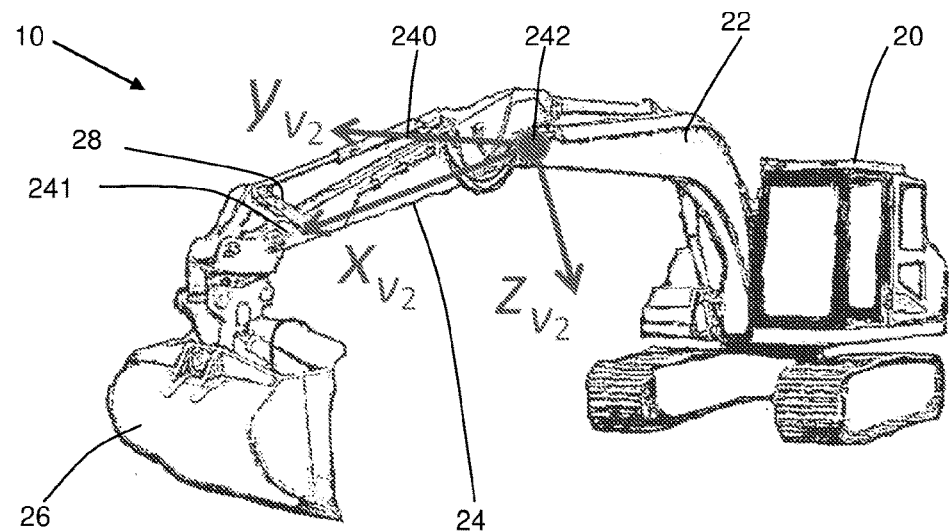
FIG. 6 illustrates an example excavator showing a stick joint co-ordinate frame.

FIG. 6 illustrates a stick joint co-ordinate frame 240 having an origin 242 at an intersection of a rotational axis of the stick joint and the symmetric plane of the stick 24. The stick joint co-ordinate frame 240 has an x-axis that is aligned with a stick reference axis 241 that extends between the stick joint and the bucket joint. As the stick joint and implement joint rotational axes are parallel to each other, the stick reference axis 241 is perpendicular to the rotational axes of both the stick joint and bucket joint. The stick joint co-ordinate frame 240 also has a y-axis that lies along the stick rotational axis and a z-axis that is orthogonal to both the x-axis and the y-axis.

Figure 7:
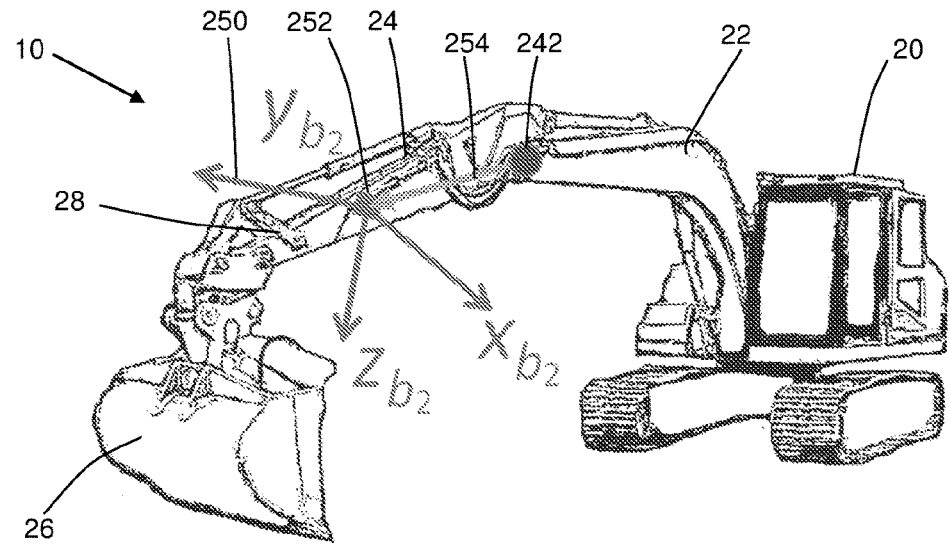
FIG. 7 illustrates an example excavator showing a stick sensor co-ordinate frame.

FIG. 7 illustrates a stick sensor co-ordinate frame 250 having an origin located at the centre of navigation of stick sensor 252 of the stick 24. The stick sensor co-ordinate frame 250 has a fixed stick displacement 254 from the origin of the stick joint co-ordinate frame 242 and a fixed angular offset with respect to the stick joint co-ordinate frame 240. Typically, the y-axis of the stick sensor frame 250 is parallel to the y-axis of the stick joint co-ordinate frame 240.

Figure 8:
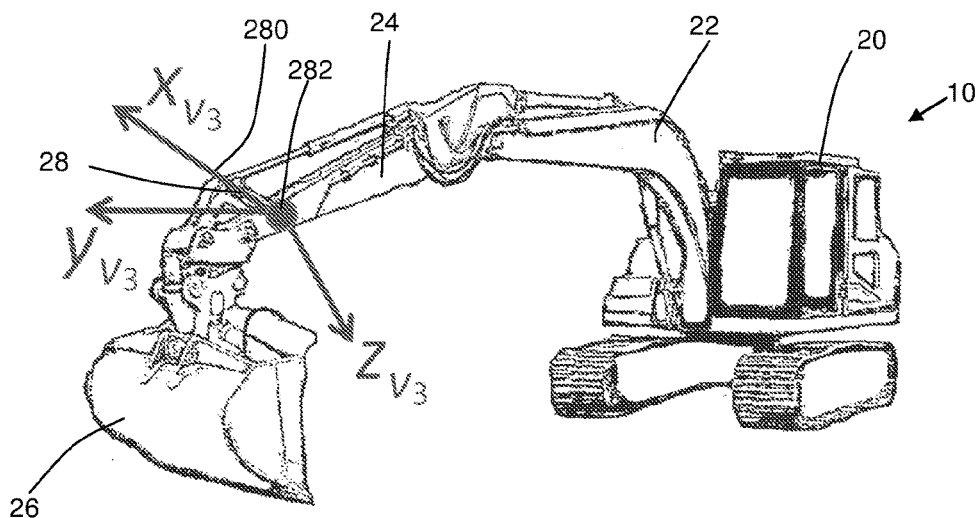
FIG. 8 illustrates an example excavator showing a dogbone joint co-ordinate frame.

FIG. 8 illustrates a dogbone joint co-ordinate frame 280 having an origin 282 at an intersection of a rotational axis of the dogbone joint and a symmetric plane of the dogbone joint 28. The dogbone joint co-ordinate frame 280 has an x-axis that is aligned with a dogbone joint reference axis (not shown for clarity) that lies on the dogbone joint symmetric plane, joining the dogbone joint 28 to the H-Joint. The dogbone joint co-ordinate frame 280 also has a y-axis that lies along the dogbone joint rotational axis and a z-axis that is orthogonal to both the x-axis and the y-axis.

Figure 9:
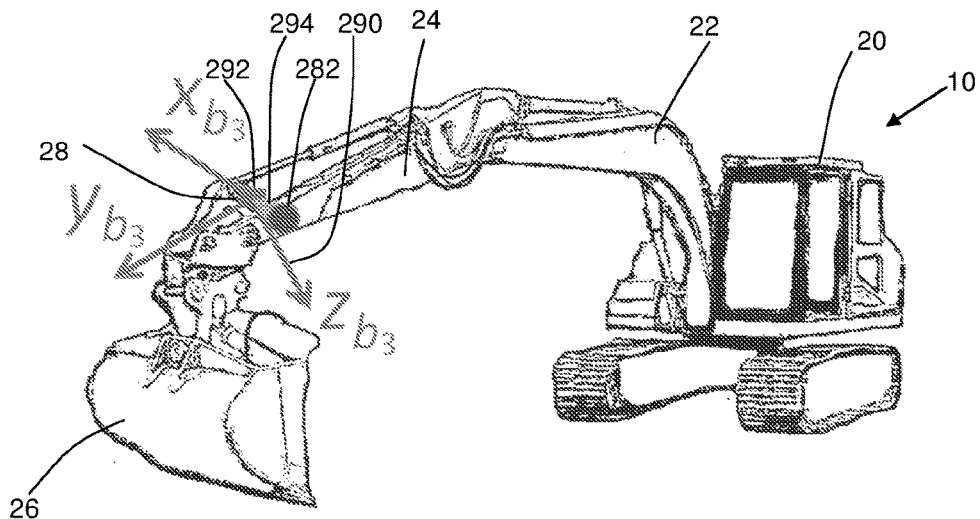
FIG. 9 illustrates an example excavator showing a dogbone sensor co-ordinate frame.

FIG. 9 illustrates a dogbone joint sensor co-ordinate frame 290 having an origin at a centre of navigation of a dogbone joint sensor 292. The dogbone joint sensor co-ordinate frame 290 has a fixed dogbone displacement 294 from the origin of the dogbone joint co-ordinate frame 282 and a fixed angular offset with respect to the dogbone joint co-ordinate frame 280.

Figure 10:
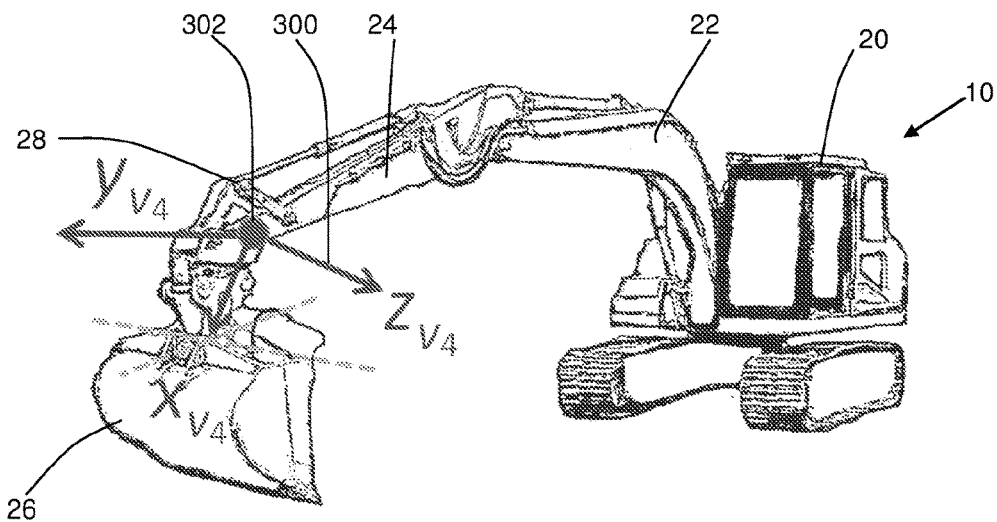
FIG. 10 illustrates an example excavator showing an implement joint co-ordinate frame.

FIG. 10 illustrates an implement co-ordinate frame 300 that has an origin 302 located at the intersection of the symmetric plane of the stick 24 and the axis of rotation of the implement joint. The implement co-ordinate frame 300 has an x-axis that lies on the symmetric plane from the origin 302 of the implement joint frame and intersects with a tilt-bucket joint, a y-axis that lies on the rotational axis of the implement joint, and a z-axis that is orthogonal to both the x-axis and the y-axis.

Figure 11:
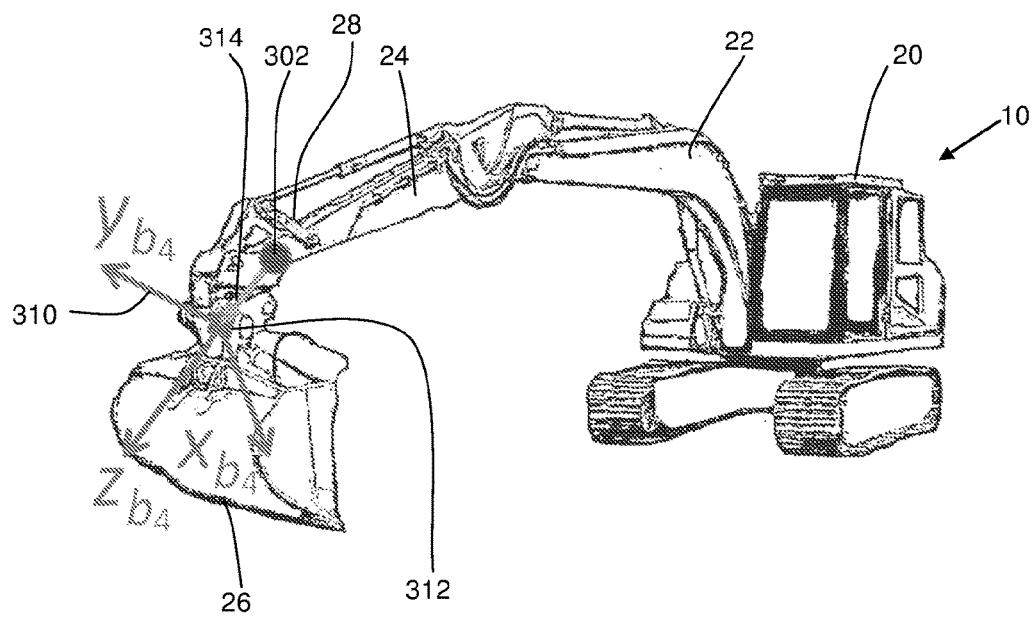
FIG. 11 illustrates an example excavator showing an implement sensor co-ordinate frame.

FIG. 11 illustrates an implement sensor co-ordinate frame 310 having an origin located at the centre of navigation of implement sensor 312. The implement sensor co-ordinate frame 310 has a fixed implement displacement 314 from the origin of the implement co-ordinate frame 302 and a fixed angular offset with respect to the implement co-ordinate frame 300.

Figure 12:
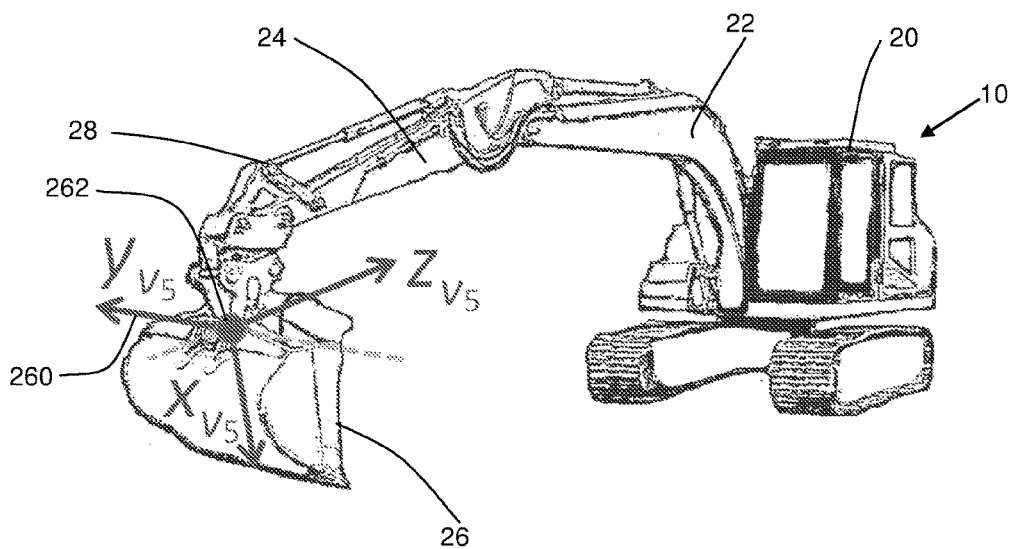
FIG. 12 illustrates an example excavator showing a tilt bucket joint co-ordinate frame.

FIG. 12 illustrates a bucket joint co-ordinate frame 260. The bucket 26 of the illustrated excavator 10 is a tilt bucket. The bucket joint co-ordinate frame 260 has an origin at an intersection of a tilt-joint pin 262 and a symmetric plane of the bucket 26 that is perpendicular to the tilt-joint pin. The bucket joint co-ordinate frame 260 has an x-axis that intersects a working edge (e.g. a cutting blade) of the bucket 26, a z-axis that is aligned with the tilt-axis pin, and a y-axis that is orthogonal to both the x-axis and the z-axis.

Figure 13:
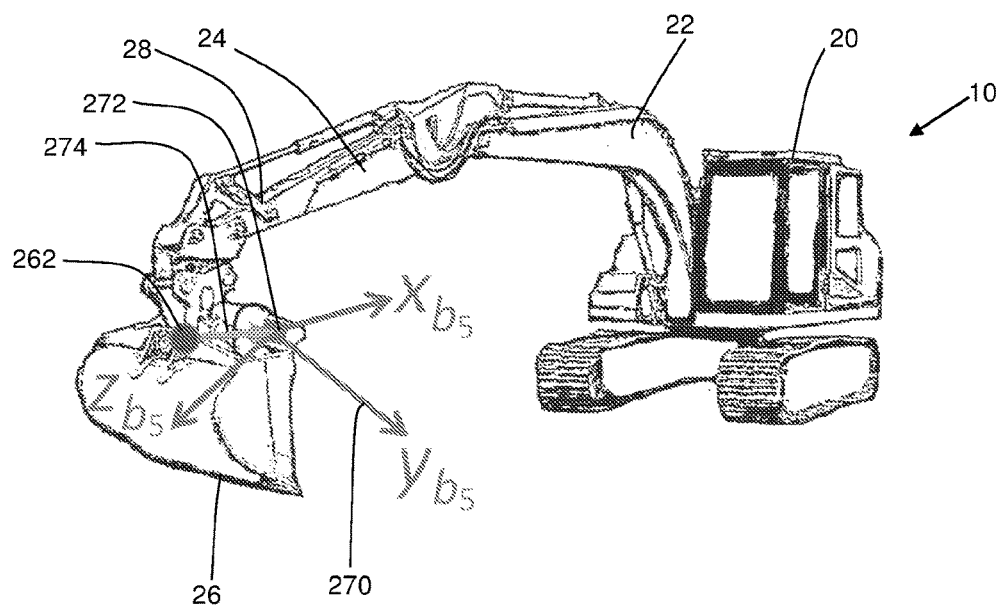
FIG. 13 illustrates an example excavator showing a tilt bucket sensor co-ordinate frame.

FIG. 13 illustrates a bucket sensor co-ordinate frame 270 having an origin at a centre of navigation of a bucket sensor 272 of the bucket 26 and its axes aligned with the bucket sensor 272 sensing axes. The bucket sensor co-ordinate frame 270 has a fixed bucket displacement 274 from the origin of the bucket joint co-ordinate frame 262 and a fixed angular offset with respect to the bucket joint co-ordinate frame 260.

Once the co-ordinate frames have been defined a kinematic relationship for each movable member can be defined by applying general kinematic equations to the system. Each kinematic equation is applied successively down a kinematic chain such that the kinematic relationship for subsequent movable members is dependent upon the kinematic relationship of a previous movable member.

Co-ordinate frame indices are defined as follows: chassis frame 200: $v_0$, chassis sensor co-ordinate frame 210: $b_0$, boom joint co-ordinate frame 220: $v_1$, boom sensor co-ordinate frame 230: $b_1$, stick joint co-ordinate frame 240: $v_2$, stick sensor co-ordinate frame 250: $b_2$, dogbone joint co-ordinate frame 280: $v_3$, dogbone joint sensor co-ordinate frame 290: $b_3$, implement joint co-ordinate frame 300: $v_4$, implement sensor co-ordinate frame 310: $b_4$, tilt bucket joint co-ordinate frame 260: $v_5$, and tilt bucket sensor co-ordinate frame 270: $b_5$ The boom joint position may be stated as:

$$r_{ev_1}^{e} = r_{ev_0}^{e} + R_{v_0}^{e} r_{v_0 v_1}^{v_0}$$

Where $R_{v_0}^{n}$ is the rotation of the chassis 20 with respect the navigation frame and $r_{v_0 v_1}^{v_0}$ is the displacement of the boom joint co-ordinate frame 220, with respect to the chassis 20, $r_{nv_0}^{n}$ is the position of the chassis 20 with respect to the navigation frame, and $r_{nv_1}^{n}$ is the position of the boom 22 with respect to the navigation frame.

Differentiating with respect to time yields velocity of the boom joint co-ordinate frame 220:

$$\dot{r}_{nv_1}^{n} = \dot{r}_{nv_0}^{n} + R_{v_0}^{n}([\omega_{nv_0}^{v_0}]_x r_{v_0 v_1}^{v_0} + \dot{r}_{v_0 v_1}^{v_0})$$

Since the boom joint is fixed relative to the vehicle $\dot{r}_{v_0 v_1}^{v_0} = 0_3$ which results in:

$$\dot{r}_{nv_1}^{n} = \dot{r}_{nv_0}^{n} + R_{v_0}^{n}[\omega_{nv_0}^{v_0}]_x r_{v_0 v_1}^{v_0}$$

Differentiating again leads to acceleration of the boom joint co-ordinate frame 220:

$$\ddot{r}_{nv_1}^{n} = \ddot{r}_{nv_0}^{n} + R_{v_0}^{n}[\omega_{nv_0}^{v_0}]_x r_{v_0 v_1}^{v_0} + 2R_{v_0}^{n}[\omega_{nv_0}^{v_0}]_x \dot{r}_{v_0 v_1}^{v_0} + R_{v_0}^{n}[\omega_{nv_0}^{v_0}]_x r_{v_0 v_1}^{v_0}$$

Noting again that the boom joint is fixed with respect to the chassis frame 200, acceleration reduces to:

$$\ddot{r}_{nv_1}^{n} = \ddot{r}_{nv_0}^{n} + R_{v_0}^{n}(([\omega_{nv_0}^{v_0}]_x)^2 + [\dot{\omega}_{nv_0}^{v_0}]_x) r_{v_0 v_1}^{v_0}$$

The kinematics of the boom joint is a necessary step in determining the kinematics at the boom sensor 232, which is the location where the accelerations are observed. The position of the boom sensor 232 may be calculated from both the position of the excavator 10 and the position of the boom joint co-ordinate frame 220 as follows:

$$r_{nb_1}^{n} = r_{nv_0}^{n} + R_{v_0}^{n} r_{v_0 v_1}^{v_0} + R_{v_1}^{n} r_{v_1 b_1}^{v_1}$$

Where $r_{nb_1}^{n}$ is the position of the boom sensor 232 relative to the navigation frame and $r_{v_1 b_1}^{v_1}$ is the position of the boom sensor 232 relative to the boom joint co-ordinate frame 220. As the position of the boom joint forms part of this equation, the boom sensor position may be expressed in terms of the boom joint:

$$r_{nb_1}^{n} = r_{nv_1}^{n} + R_{v_1}^{n} r_{v_1 b_1}^{v_1}$$

Differentiating with respect to time, and noting that the boom sensor 232 is fixed in the boom joint co-ordinate frame 220 yields the velocity at the boom sensor 232:

$$\dot{r}_{nb_1}^{n} = \dot{r}_{nv_1}^{n} + R_{v_1}^{n}[\omega_{nv_1}^{v_1}]_x r_{v_1 b_1}^{v_1}$$

Differentiating with respect to time again and applying the same constraint yields the acceleration at the boom sensor 232 with respect to the navigation frame:

$$\ddot{r}_{nb_1}^{n} = \ddot{r}_{nv_1}^{n} + R_{v_1}^{n}(([\omega_{nv_1}^{v_1}]_x)^2 + [\dot{\omega}_{nv_1}^{v_1}]_x) r_{v_1 b_1}^{v_1}$$

Now that the kinematic relationships at the boom joint have been determined, an observation model of the inclinometers in the boom sensor 232 may be constructed. The sensors are generally considered to be 'perfect', but implementation should account for any imperfections.

The boom sensor 232 accelerometer model should be reconciled with the boom sensor 232 acceleration measurements $\tilde{f}_{nb_1}^{b_1}$ and the boom sensor 232 gyroscope measurements, $\omega_{nb_1}^{b_1}$. The angular accelerations may either be directly measured by one or more angular accelerometers or by estimating the derivative of the angular rate. Alternatively, the angular acceleration may be ignored altogether at the expense of accuracy.

The kinematics accelerations acting on the boom sensor may alternatively be accounted for by a plurality of sensors mounted at spatially diverse locations on the boom. Since the same angular rate and angular accelerations act on each said boom sensor, but induces a different acceleration via a different lever arm $r_{v b_1}^{v_1}$ of each sensor, the effect may be determined and duly compensated.

It is also convenient to split the rotation $R_{v_1}^{n}$ into two components, $R_{v_1}^{v_0}$ which is the relative rotation of the boom 22 with respect to the excavator 10 and $R_{v_0}^{n}$ the excavator 10 attitude. These two components are typically estimated separately.

Given a known (or estimated) rotation between the boom sensor co-ordinate frame 230 and the boom joint co-ordinate frame $R_{b_1}^{v_1}$, sensor measurements in the boom frame may be expressed as:

$$\tilde{f}_{nb_1}^{v_1} = R_{b_1}^{v_1} \tilde{f}_{nb_1}^{b_1}$$

$$\omega_{nb_1}^{v_1} = R_{b_1}^{v_1} \omega_{nb_1}^{b_1}$$

Taking into account gravity, the specific force measured by the boom sensor 232 accelerometers is:

$$\tilde{f}_{nb_1}^{b_1} = R_{v_1}^{b_1} R_{v_0}^{v_1} R_{n}^{v_0} (\ddot{r}_{nv_1}^{n} - g^n) + R_{v_1}^{b_1}(([\omega_{nv_1}^{v_1}]_x)^2 + [\dot{\omega}_{nv_1}^{v_1}]_x) r_{v_1 b_1}^{v_1}$$

Kinematic contributions due to linear acceleration, Euler acceleration, and centrifugal acceleration can be clearly identified. Therefore, if measurements, or at least estimates, exist of angular rate, angular acceleration, and linear acceleration, then the kinematic effects that affect dynamic performance can be compensated for entirely. Alternatively, the induced Euler acceleration and centrifugal acceleration may be compensated by means of a plurality of sensors, preferably sensors mounted to the boom, with or without the assistance of angular rate and/or angular acceleration measurements.

Following a similar procedure to that described for the boom sensor 232, the chassis sensor 212 kinematic relationships and observables are summarised as follows:

$$r_{nb_0}^{n} = r_{nv_0}^{n} + R_{v_0}^{n} r_{v_0 b_0}^{v_0} \qquad \text{Position:}$$

$$\dot{r}_{nb_0}^{n} = \dot{r}_{nv_0}^{n} + R_{v_0}^{n}[\omega_{nv_0}^{v_0}]_x r_{v_0 b_0}^{v_0} \qquad \text{Velocity:}$$

$$\ddot{r}_{nb_0}^{n} = \ddot{r}_{nv_0}^{n} + R_{v_0}^{n}(([\omega_{nv_0}^{v_0}]_x)^2 + [\dot{\omega}_{nv_0}^{v_0}]_x) r_{v_0 v_0}^{v_0} \qquad \text{Acceleration:}$$

$$\tilde{f}_{nb_0}{}^{b0} = R_{v_0}{}^{b0} R_n{}^{v0} (\ddot{r}_{nv_0}{}^n - g^n) + R_{v_0}{}^{b0} (([\omega_{nv_0}{}^{v0}]_x)^2 + [\dot{\omega}_{nv_0}{}^{v0}]_x) r_{v_0 b_0}{}^{v0}$$ Observables:

Following a similar procedure, the stick joint 242 kinematic relationships are summarised as follows:

$$r_{nv_2}{}^n = r_{nv_1}{}^n + R_{v_1}{}^n r_{v_1 v_2}{}^{v1}$$ Position:

$$\dot{r}_{nv_2}{}^n = \dot{r}_{nv_1}{}^n + R_{v_1}{}^n [\omega_{nv_1}{}^{v1}]_x r_{v_1 v_2}{}^{v1}$$ Velocity:

$$\ddot{r}_{nv_2}{}^n = \ddot{r}_{nv_1}{}^n + R_{v_1}{}^n (([\omega_{nv_1}{}^{v1}]_x)^2 + [\dot{\omega}_{nv_1}{}^{v1}]_x) r_{v_1 v_2}{}^{v1}$$ Acceleration:

Following a similar procedure, the stick sensor 252 kinematic relationships and observables are summarised as follows:

$$r_{nb_2}{}^n = r_{nv_2}{}^n + R_{v_2}{}^n r_{v_2 b_2}{}^{v2}$$ Position:

$$\dot{r}_{nb_2}{}^n = \dot{r}_{nv_2}{}^n + R_{v_2}{}^n [\omega_{nv_2}{}^{v1}]_x r_{v_2 b_2}{}^{v2}$$ Velocity:

$$\ddot{r}_{nb_2}{}^n = \ddot{r}_{nv_2}{}^n + R_{v_2}{}^n (([\omega_{nv_2}{}^{v0}]_x)^2 + [\dot{\omega}_{nv_2}{}^{v0}]_x) r_{v_2 v_2}{}^{v2}$$ Acceleration:

$$\tilde{f}_{nb_2}{}^{b2} = R_{v_2}{}^{v2} R_{v_1}{}^{v2} R_{v_0}{}^{v1} R_n{}^{v0} (\ddot{r}_{nv_2}{}^n - g^n) + R_{v_2}{}^{b2} (([\omega_{nv_2}{}^{v2}]_x)^2 + [\dot{\omega}_{nv_2}{}^{v2}]_x) r_{v_2 b_2}{}^{v2}$$ Observables:

Following a similar procedure, the dogbone joint 282 kinematic relationships are summarised as follows:

$$r_{nv_3}{}^n = r_{nv_2}{}^n + R_{v_2}{}^n r_{v_2 b_3}{}^{v2}$$ Position:

$$\dot{r}_{nv_3}{}^n = \dot{r}_{nv_2}{}^n + R_{v_2}{}^n [\omega_{nv_2}{}^{v2}]_x r_{v_2 b_3}{}^{v2}$$ Velocity:

$$\ddot{r}_{nv_3}{}^n = \ddot{r}_{nv_2}{}^n + R_{v_2}{}^n (([\omega_{nv_2}{}^{v2}]_x)^2 + [\dot{\omega}_{nv_2}{}^{v2}]_x) r_{v_2 v_3}{}^{v2}$$ Acceleration:

Following a similar procedure, the dogbone sensor 292 kinematic relationships and observables are summarised as follows:

$$r_{nb_3}{}^n = r_{nv_3}{}^n + R_{v_3}{}^n r_{v_3 b_3}{}^{v3}$$ Position:

$$\dot{r}_{nb_3}{}^n = \dot{r}_{nv_3}{}^n + R_{v_3}{}^n [\omega_{nv_2}{}^{v2}]_x r_{v_3 b_3}{}^{v3}$$ Velocity:

$$\ddot{r}_{nb_3}{}^n = \ddot{r}_{nv_3}{}^n + R_{v_3}{}^n (([\omega_{nv_3}{}^{v3}]_x)^2 + [\dot{\omega}_{nv_3}{}^{v3}]_x) r_{v_3 v_3}{}^{v3}$$ Acceleration:

$$\tilde{f}_{nb_3}{}^{b3} = R_{v_3}{}^{b3} R_{v_0}{}^{v3} R_n{}^{v0} (\ddot{r}_{nv_3}{}^n - g^n) + R_{v_3}{}^{b3} (([\omega_{nv_3}{}^{v3}]_x)^2 + [\dot{\omega}_{nv_3}{}^{v3}]_x) r_{v_3 b_3}{}^{v3}$$ Observables:

Following a similar procedure, the implement joint 302 kinematic relationships are summarised as follows:

$$r_{nv_4}{}^n = r_{nv_2}{}^n + R_{v_2}{}^n r_{v_2 b_4}{}^{v2}$$ Position:

$$\dot{r}_{nv_4}{}^n = \dot{r}_{nv_2}{}^n + R_{v_2}{}^n [\omega_{nv_2}{}^{v2}]_x r_{v_2 b_4}{}^{v2}$$ Velocity:

$$\ddot{r}_{nv_4}{}^n = \ddot{r}_{nv_2}{}^n + R_{v_2}{}^n (([\omega_{nv_2}{}^{v2}]_x)^2 + [\dot{\omega}_{nv_2}{}^{v2}]_x) r_{v_2 v_4}{}^{v2}$$ Acceleration:

Following a similar procedure, the implement sensor 312 kinematic relationships and observables are summarised as follows:

$$r_{nb_4}{}^n = r_{nv_4}{}^n + R_{v_4}{}^n r_{v_4 b_4}{}^{v4}$$ Position:

$$\dot{r}_{nb_4}{}^n = \dot{r}_{nv_4}{}^n + R_{v_4}{}^n [\omega_{nv_4}{}^{v4}]_x r_{v_4 b_4}{}^{v4}$$ Velocity:

$$\ddot{r}_{nb_4}{}^n = \ddot{r}_{nv_4}{}^n + R_{v_4}{}^n (([\omega_{nv_4}{}^{v4}]_x)^2 + [\dot{\omega}_{nv_4}{}^{v4}]_x) r_{v_4 v_4}{}^{v4}$$ Acceleration:

$$\tilde{f}_{nb_4}{}^{b4} = R_{v_4}{}^{b4} R_{v_0}{}^{v4} R_n{}^{v0} (\ddot{r}_{nv_4}{}^n - g^n) + R_{v_4}{}^{b4} (([\omega_{nv_4}{}^{v4}]_x)^2 + [\dot{\omega}_{nv_4}{}^{v4}]_x) r_{v_4 b_4}{}^{v4}$$ Observables:

Following a similar procedure, the tilt bucket joint 262 kinematic relationships are summarised as follows:

$$r_{nv_5}{}^n = r_{nv_4}{}^n + R_{v_4}{}^n r_{v_4 b_5}{}^{v4}$$ Position:

$$\dot{r}_{nv_5}{}^n = \dot{r}_{nv_4}{}^n + R_{v_4}{}^n [\omega_{nv_4}{}^{v4}]_x r_{v_4 b_5}{}^{v4}$$ Velocity:

$$\ddot{r}_{nv_5}{}^n = \ddot{r}_{nv_5}{}^n + R_{v_4}{}^n (([\omega_{nv_4}{}^{v4}]_x)^2 + [\dot{\omega}_{nv_4}{}^{v4}]_x) r_{v_4 v_5}{}^{v4}$$ Acceleration:

Following a similar procedure, the tilt bucket sensor 272 kinematic relationships and observables are summarised as follows:

$$r_{nb_5}{}^n = r_{nv_5}{}^n + R_{v_5}{}^n r_{v_5 b_5}{}^{v5}$$ Position:

$$\dot{r}_{nb_5}{}^n = \dot{r}_{nv_5}{}^n + R_{v_5}{}^n [\omega_{nv_5}{}^{v5}]_x r_{v_5 b_5}{}^{v5}$$ Velocity:

$$\ddot{r}_{nb_5}{}^n = \ddot{r}_{nv_5}{}^n + R_{v_5}{}^n (([\omega_{nv_5}{}^{v5}]_x)^2 + [\dot{\omega}_{nv_5}{}^{v5}]_x) r_{v_5 v_5}{}^{v5}$$ Acceleration:

$$\tilde{f}_{nb_5}{}^{b5} = R_{v_5}{}^{b5} R_{v_0}{}^{v5} R_n{}^{v0} (\ddot{r}_{nv_5}{}^n - g^n) + R_{v_5}{}^{b5} (([\omega_{nv_5}{}^{v5}]_x)^2 + [\dot{\omega}_{nv_5}{}^{v5}]_x) r_{v_5 b_5}{}^{v5}$$ Observables:

Sensors do not necessarily need to be mounted directly to every member of the kinematic chain. Instead, it may be preferable to mount a sensor on a related linkage which is mechanically coupled to the linkage of interest. A model of closed chain kinematics may therefore be required.

Figure 14:
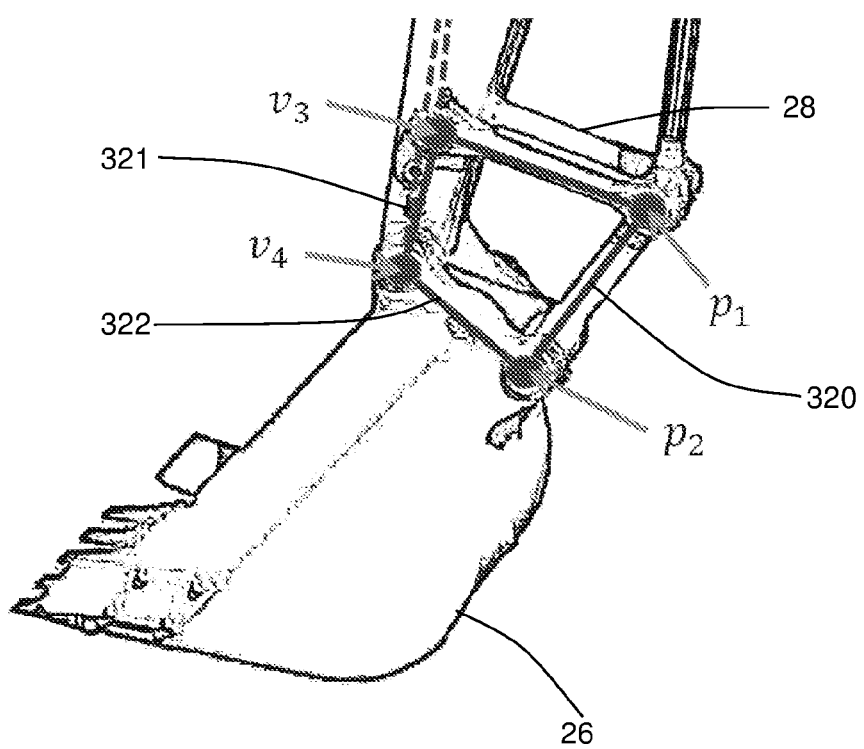
FIG. 14 illustrates a close up view of a bucket and dogbone portion of an excavator showing dogbone linkages to the bucket.

For example, a sensor may be mounted on the dogbone 28 of an excavator 10 instead of on an implement linkage so that it is less likely to be damaged during normal operations. The attachment of the dogbone 28 and implement linkage to the stick 24 and tipping link 321 forms a closed kinematic chain. As illustrated in FIG. 14 the closed kinematic chain is, in this instance, a planar quadrilateral linkage 320 having joints p1, p2, v3, and v4.

Given the geometry of the linkages, the angle of the dogbone relative to the stick 24 $\theta_{v_2}{}^{v3}$ and the angular rate of the dogbone 28 relative to the stick 24 $[\omega_{v_2 v_3}{}^{v3}]_x$, the angle of the implement linkage 322 relative to the stick 24 $\theta_{v_2}{}^{p2}$ and the angular rate of the implement linkage 322 relative to the stick 24 $[\omega_{v_2 p_2}{}^{p2}]_x$, and the angular acceleration of the implement linkage 322 relative to the stick 24 are required. Once the desired values are calculated they may be substituted into the open-chain kinematics described previously.

For such an example the dogbone co-ordinate system 280 remains as described previously, but two new coordinate systems must now be considered, namely the tipping link joint coordinate system and the H-joint coordinate system. A tipping link joint co-ordinate frame is defined as having an origin that lies on the intersection of the axis of rotation of tipping link joint (p2) and the symmetric plane of the planar linkage with the x-axis intersecting joint v4, the y-axis being parallel to the axis of rotation, and the z-axis as being orthogonal to the x-axis and the y-axis.

A H-joint co-ordinate frame is defined as having an origin at the intersection of the axis of rotation of the H-joint (p1) and the symmetric plane of the planar linkage, with the x-axis interesting the tipping rod joint (p2), the y-axis being parallel to the axis of rotation and the z-axis being orthogonal to the x-axis and y-axis.

Consider a plane formed by the quadrilateral linkage 320 which lies parallel with the x-z plane of the stick 24 co-ordinate frame 240. Two of the joints, namely the dogbone joint and the implement joint, are geometrically fixed relative to the stick 24 co-ordinate frame 240 and can be measured during calibration. Accordingly:

$$r_{v_3 v_4}{}^{v2} = r_{v_2 v_4}{}^{v2} - r_{v_2 v_3}{}^{v2}$$

Which is a time invariant quantity.

Since the lengths of the linkages are known, each linkage may be defined in its own coordinate frame as follows:

$$r_{v_3 p_1}{}^{v3} [\|r_{v_3 p_1}{}^{v3}\| \ 0 \ 0]^T$$

$$r_{p_1 p_2}{}^{p1} [\|r_{p_1 p_2}{}^{p1}\| \ 0 \ 0]^T$$

$$r_{p_2 v_4}{}^{p2} [\|r_{p_2 v_4}{}^{p2}\| \ 0 \ 0]^T$$

Since all linkages lie on a plane, each rotation matrix for any given member is an intrinsic rotation about the y-axis, as follows:

$$R_{v_3}{}^{v_2} = R_Y(\theta_{v_3}{}^{v_2})$$

$$R_{p_1}{}^{v_2} = R_Y(\theta_{p_1}{}^{v_2})$$

$$R_{p_2}{}^{v_2} = R_Y(\theta_{p_2}{}^{v_2})$$

Since the chain is closed, positions of the linkages must satisfy:

$$r_{v_3v_4}{}^{v_2} = r_{v_3p_1}{}^{v_2} + r_{p_1p_2}{}^{v_2} + r_{p_2v_4}{}^{v_2}$$

Rotating from the stick frame to their native frames yields:

$$r_{v_3v_4}{}^{v_2} = R_{v_3}{}^{v_2} r_{v_3p_1}{}^{v_2} + R_{p_1}{}^{v_2} r_{p_1p_2}{}^{p_1} + R_{p_2}{}^{v_2} r_{p_2v_4}{}^{p_2}$$

Rearranging in terms of known and unknown quantities:

$$r_{v_3v_4}{}^{v_2} - R_{v_3}{}^{v_2} r_{v_3p_1}{}^{v_3} = R_{p_1}{}^{v_2} r_{p_1p_2}{}^{p_1} + R_{p_2}{}^{v_2} r_{p_2v_4}{}^{p_2}$$

Since the left hand side of this equation consists entirely of known values, it may be more succinctly written as:

$$k = R_Y(\theta_{p_2}{}^{v_2}) r_{p_2v_4}{}^{p_2} + R_Y(\theta_{p_1}{}^{v_2}) r_{p_1p_2}{}^{p_1}$$

Where:

$$k = r_{v_3v_4}{}^{v_2} - R_{v_3}{}^{v_2} r_{v_3p_1}{}^{v_3}$$

Explicitly writing the matrix equations results in the following:

$$\begin{bmatrix} k_1 \\ 0 \\ k_3 \end{bmatrix} = \begin{bmatrix} \cos(\theta_{p_2}^{v_2}) & 0 & -\sin(\theta_{p_2}^{v_2}) \\ 0 & 1 & 0 \\ \sin(\theta_{p_2}^{v_2}) & 0 & \cos(\theta_{p_2}^{v_2}) \end{bmatrix} \begin{bmatrix} \|r_{p_2v_4}^{p_2}\| \\ 0 \\ 0 \end{bmatrix} + \begin{bmatrix} \cos(\theta_{p_1}^{v_2}) & 0 & -\sin(\theta_{p_1}^{v_2}) \\ 0 & 1 & 0 \\ \sin(\theta_{p_1}^{v_2}) & 0 & \cos(\theta_{p_1}^{v_2}) \end{bmatrix} \begin{bmatrix} \|r_{p_1p_2}^{p_1}\| \\ 0 \\ 0 \end{bmatrix}$$

Which may be arranged and rewritten as two simultaneous equations as follows:

$$\cos(\theta_{p_2}^{v_2}) = \frac{k_1 - \|r_{p_1p_2}^{p_1}\| \cos(\theta_{p_1}^{v_2})}{\|r_{p_2v_4}^{p_2}\|}$$

$$\sin(\theta_{p_2}^{v_2}) = \frac{k_3 - \|r_{p_1p_2}^{p_1}\| \sin(\theta_{p_1}^{v_2})}{\|r_{p_2v_4}^{p_2}\|}$$

Using the identity:

$$\cos^2(\theta) + \sin^2(\theta) = 1$$

Therefore:

$$\|r_{p_2v_4}^{p_2}\|^2 = (k_1 - \|r_{p_1p_2}^{p_1}\| \cos(\theta_{p_1}^{v_2}))^2 + (k_3 - \|r_{p_1p_2}^{p_1}\| \sin(\theta_{p_1}^{v_2}))^2$$

Which can be rearranged as:

$$k_1 \cos(\theta_{p_1}^{v_2}) + k_3 \sin(\theta_{p_1}^{v_2}) = \frac{\|r_{p_2v_4}^{p_2}\|^2 - \|r_{p_1p_2}^{p_1}\|^2 - k_1^2 - k_3^2}{-2\|r_{p_1p_2}^{p_1}\|}$$

Which is of the form:

$$P \cos(\theta) + Q \sin(\theta) = M$$

The solutions of which are:

$$\theta = 2\operatorname{atan}\left(\frac{Q \pm \sqrt{P^2 + Q^2 - M^2}}{P + M}\right)$$

Or equivalently:

$$\theta = \operatorname{atan2}(Q, P) \pm \operatorname{acos}\left(\frac{M}{\sqrt{P^2 + Q^2}}\right)$$

Since the sin and cos are directly of interest, they may be calculated directly without calculating the angle by using the following equations:

$$\sin(\theta) = \frac{(P + M)(Q \pm \sqrt{P^2 + Q^2 - M^2})}{\pm Q\sqrt{P^2 + Q^2 - M^2} + P^2 + Q^2 + PM}$$

And $$\cos(\theta) = \frac{\mp Q\sqrt{P^2 + Q^2 - M^2} + M^2 - Q^2 + PM}{\pm Q\sqrt{P^2 + Q^2 - M^2} + P^2 + Q^2 + PM}$$

Substituting for M, P and Q in terms of geometry and known angles may yield up to two solutions. However, only one of these angles will be physically possible to achieve. Impossible solutions can therefore be eliminated.

Once the angle $\theta_{p_2}{}^{v_2}$ has been calculated, it may be directly substituted to determine $\theta_{p_1}{}^{v_2}$. There may be more than one possible angle that satisfies the solution, but only one angle will be physically possible to achieve. Impossible solutions can therefore be eliminated.

Recalling that the closed-chain positions must satisfy:

$$r_{v_3v_4}{}^{v_2} = r_{v_3p_1}{}^{v_2} + r_{p_1p_2}{}^{v_2} + r_{p_2v_4}{}^{v_2}$$

Rotating from the stick co-ordinate frame 240 to their native frames yields:

$$r_{v_3v_4}{}^{v_2} = R_{v_3}{}^{v_2} r_{v_3p_1}{}^{v_3} + R_{p_1}{}^{v_2} r_{p_1p_2}{}^{p_1} + R_{p_2}{}^{v_2} r_{p_2v_4}{}^{p_2}$$

Taking the time derivative of both sides of this equation, noting that the vector quantities in their native frames and noting that $r_{v_3v_4}{}^{v_2}$ is constant results in:

$$O_3 = \dot{R}_{v_3}{}^{v_2} r_{v_3p_1}{}^{v_3} + \dot{R}_{p_1}{}^{v_2} r_{p_1p_2}{}^{p_1} + \dot{R}_{p_2}{}^{v_2} r_{p_2v_4}{}^{p_2}$$

Noting the time derivative of rotation matrix for each member:

$$\dot{R}_{v_3}{}^{v_2} = R_{v_3}{}^{v_2} [\omega_{v_2v_3}{}^{v_3}]_x$$

$$\dot{R}_{p_2}{}^{v_2} = R_{p_2}{}^{v_2} [\omega_{v_2p_2}{}^{p_2}]_x$$

$$\dot{R}_{p_1}{}^{v_2} = R_{p_1}{}^{v_2} [\omega_{v_2p_1}{}^{p_1}]_x$$

Applying:

$$O_3 = R_{v_3}{}^{v_2} [\omega_{v_2v_3}{}^{v_3}]_x r_{v_3p_1}{}^{v_3} + R_{p_1}{}^{v_2} [\omega_{v_2p_1}{}^{p_1}]_x r_{p_1p_2}{}^{p_1} + R_{p_2}{}^{v_2} [\omega_{v_2p_2}{}^{p_2}]_x r_{p_2v_4}{}^{p_2}$$

Multiplying through by $R_{v_2}{}^{p_2}$ and simplifying results in:

$$O_3 = R_{v_3}{}^{v_2} [\omega_{v_2v_3}{}^{v_3}]_x r_{v_3p_1}{}^{v_3} + R_{p_1}{}^{v_2} [\omega_{v_2p_1}{}^{p_1}]_x r_{p_1p_2}{}^{p_1} + [\omega_{v_2p_2}{}^{p_2}]_x r_{p_2v_4}{}^{p_2}$$

Since the system is planar and lies entirely along the x-z plane, the angular rate occurs about the y-axis. Moreover, each vector in the above equation lies entirely along its x-axis. Therefore, an angular rate $\omega_y$ about a vector $r_x$ may be written as:

$$[\omega_y]_x u_x = \begin{bmatrix} 0 & 0 & \omega_y \\ 0 & 0 & 0 \\ -\omega_y & 0 & 0 \end{bmatrix} \begin{bmatrix} r_x \\ 0 \\ 0 \end{bmatrix}$$

$$= \begin{bmatrix} 0 \\ 0 \\ -\omega_y r_x \end{bmatrix}$$

Substituting, and explicitly writing in terms of intrinsic rotations:

$$\begin{bmatrix} 0 \\ 0 \\ 0 \end{bmatrix} = \begin{bmatrix} \cos(\theta_{v_3}^{p_2}) & 0 & -\sin(\theta_{v_3}^{p_2}) \\ 0 & 1 & 0 \\ \sin(\theta_{v_3}^{p_2}) & 0 & \cos(\theta_{v_3}^{p_2}) \end{bmatrix} \begin{bmatrix} 0 \\ 0 \\ -\omega_{v_2 v_3,y}^{v_3} \|r_{v_3 P_1}^{v_3}\| \end{bmatrix} +$$

$$\begin{bmatrix} \cos(\theta_{P_1}^{p_2}) & 0 & -\sin(\theta_{P_1}^{p_2}) \\ 0 & 1 & 0 \\ \sin(\theta_{P_1}^{p_2}) & 0 & \cos(\theta_{P_1}^{p_2}) \end{bmatrix} \begin{bmatrix} 0 \\ 0 \\ -\omega_{v_2 P_1,y}^{P_1} \|r_{P_1 P_2}^{P_1}\| \end{bmatrix} + \begin{bmatrix} 0 \\ 0 \\ -\omega_{v_2 P_2,y}^{P_2} \|r_{P_2 v_4}^{P_2}\| \end{bmatrix}$$

Equating the components in x:

$$-\sin(\theta_{v_3}^{p_2}) \omega_{v_2 v_3,y}^{p_2} \|r_{v P_1}^{v_3}\| \sin(\theta_{P_1}^{p_2}) \omega_{v_2 P_1, y}^{P_1} \|r_{P_1 P_2}\|$$

Solving for $\omega_{v_2 P_1, y}^{P_1}$:

$$\omega_{v_2 P_1, y}^{P_1} = \omega_{v_2 v_3, y}^{v_3} \frac{-\sin(\theta_{v_3}^{p_2}) \|r_{v_3 P_1}^{v_3}\|}{\sin(\theta_{P_1}^{p_2}) \|r_{P_1 P_2}^{P_1}\|}$$

To calculate $\omega_{v_2 P_2}^{P_2}$, the above result can be directly substituted:

$$\omega_{v_2 P_2, y}^{P_2} = \frac{\cos(\theta_{v_3}^{p_2}) \omega_{v_2 v_3, y}^{v_3} \|r_{v_3 P_1}^{v_3}\| + \cos(\theta_{P_1}^{p_2}) \omega_{v_2 P_1, y}^{P_1} \|r_{P_1 P_2}^{P_1}\|}{-\|r_{P_2 v_4}^{P_2}\|}$$

Accordingly, the relative angular rate of the implement linkage can be found in terms of the angular rate of the dogbone 28 and linkage geometry 320.

Repeating the time derivative of the closed-chain position:

$$O_3 = R_{v_3}^{v_2}[\omega_{v_2 v_3}^{v_3}]_x r_{v P_1}^{v_3} + R_{P_1}^{v_2}[\omega_{v_2 P_1}^{P_1}]_x r_{P_1 P_2}^{P_1} + R_{P_2}^{v_2}[\omega_{v_2 P_2}^{P_2}]_x r_{P_2 v_4}^{P_2}$$

Taking the time derivative and rearranging yields:

$$O_3 = R_{v_3}^{v_2}([\omega_{v_2 v_3}^{v_3}]_x^2 + [\dot{\omega}_{v_2 v_3}^{v_3}]_x) r_{v P_1}^{v_3} + R_{P_1}^{v_2} ([\omega_{v_2 P_1}^{P_1}]_x^2 + [\dot{\omega}_{v_2 P_1}^{P_1}]_x) r_{P_1 P_2}^{P_1} + R_{P_2}^{v_2}([\omega_{v_2 P_2}^{P_2}]_x^2 + [\dot{\omega}_{v_2 P_2}^{P_2}]_x) r_{P_2 v_4}^{P_2}$$

Since the only rotational degree of freedom is about the y-axis, the angular acceleration will always be about this axis. Accordingly, each term may be simplified as:

$$([\omega_y]_x^2 + [\dot{\omega}_y]_x) r_x = \left( \begin{bmatrix} -\omega_y^2 & 0 & 0 \\ 0 & 0 & 0 \\ 0 & 0 & -\omega_y^2 \end{bmatrix} + \begin{bmatrix} 0 & 0 & \dot{\omega}_y \\ 0 & 0 & 0 \\ -\dot{\omega}_y & 0 & 0 \end{bmatrix} \right) \begin{bmatrix} r_x \\ 0 \\ 0 \end{bmatrix}$$

$$= \begin{bmatrix} -\omega_y^2 r_x \\ 0 \\ -\dot{\omega}_y r_x \end{bmatrix}$$

Applying and multiplying through by $R_{p_2}^{v_2}$:

$$\begin{bmatrix} 0 \\ 0 \\ 0 \end{bmatrix} = \begin{bmatrix} \cos(\theta_{v_3}^{p_2}) & 0 & -\sin(\theta_{v_3}^{p_2}) \\ 0 & 1 & 0 \\ \sin(\theta_{v_3}^{p_2}) & 0 & \cos(\theta_{v_3}^{p_2}) \end{bmatrix} \begin{bmatrix} -\omega_{v_2 v_3, y}^{v_3}{}^2 \|r_{v_3 P_1}^{v_3}\| \\ 0 \\ -\dot{\omega}_{v_2 v_3, y}^{v_3} \|r_{v_3 P_1}^{v_3}\| \end{bmatrix} +$$

$$\begin{bmatrix} \cos(\theta_{P_1}^{p_2}) & 0 & -\sin(\theta_{P_1}^{p_2}) \\ 0 & 1 & 0 \\ \sin(\theta_{P_1}^{p_2}) & 0 & \cos(\theta_{P_1}^{p_2}) \end{bmatrix} \begin{bmatrix} -\omega_{v_2 P_1, y}^{P_1}{}^2 \|r_{P_1 P_2}^{P_1}\| \\ 0 \\ -\dot{\omega}_{v_2 P_1, y}^{P_1} \|r_{P_1 P_2}^{P_1}\| \end{bmatrix} + \begin{bmatrix} -\omega_{v_2 P_2, y}^{P_2}{}^2 \|r_{P_2 v_4}^{P_2}\| \\ 0 \\ -\dot{\omega}_{v_2 P_2, y}^{P_2} \|r_{P_2 v_4}^{P_2}\| \end{bmatrix}$$

Expanding and collecting the components along x results in:

$$0 = -\cos(\theta_{v_3}^{p_2}) \omega_{v_2 v_3, y}^{v_3}{}^2 \|r_{v_3 P_1}^{v_3}\| + \sin(\theta_{v_3}^{p_2}) \dot{\omega}_{v_2 v_3, y}^{v_3} \|r_{v_3 P_1}^{v_3}\| - \cos(\theta_{P_1}^{p_2}) \omega_{v_2 P_1, y}^{P_1}{}^2 \|r_{P_1 P_2}^{P_1}\| + \sin(\theta_{P_1}^{p_2}) \dot{\omega}_{v_2 P_1, y}^{P_1} \|r_{P_1 P_2}^{P_1}\| - \omega_{v_2 P_2, y}^{P_2}{}^2 \|r_{P_2 v_4}^{P_2}\|$$

Rearranging for $\dot{\omega}_{v_2 P_1, y}^{P_1}$ equals:

$$\dot{\omega}_{v_2 P_1, y}^{P_1} = \frac{(\cos(\theta_{v_3}^{p_2}) \omega_{v_2 v_3, y}^{v_3}{}^2 - \sin(\theta_{v_3}^{p_2}) \dot{\omega}_{v_2 v_3, y}^{v_3}) \|r_{v_3 P_1}^{v_3}\|}{\sin(\theta_{P_1}^{p_2}) \|r_{P_1 P_2}^{P_1}\|} +$$

$$\frac{\cos(\theta_{P_1}^{p_2}) \omega_{v_2 P_1, y}^{P_1}{}^2 \|r_{P_1 P_2}^{P_1}\| + \omega_{v_2 P_2, y}^{P_2} \|r_{P_2 v_4}^{P_2}\|}{\sin(\theta_{P_1}^{p_2}) \|r_{P_1 P_2}^{P_1}\|}$$

Expanding and collecting the components along z results in:

$$0 = -\sin(\theta_{v_3}^{p_2}) \omega_{v_2 v_3, y}^{v_3}{}^2 \|r_{v_3 P_1}^{v_3}\| - \cos(\theta_{v_3}^{p_2}) \dot{\omega}_{v_2 v_3, y}^{v_3} \|r_{v_3 P_1}^{v_3}\| - \sin(\theta_{P_1}^{p_2}) \omega_{v_2 P_1, y}^{P_1}{}^2 \|r_{P_1 P_2}^{P_1}\| - \cos(\theta_{P_1}^{p_2}) \dot{\omega}_{v_2 P_1, y}^{P_1} \|r_{P_1 P_2}^{P_1}\| - \dot{\omega}_{v_2 P_2, y}^{P_2} \|r_{P_2 v_4}^{P_2}\|$$

Solving for $\dot{\omega}_{v_2 P_2, y}^{P_2}$ yields:

$$\dot{\omega}_{v_3 P_2, y}^{P_2} = \frac{-\|r_{v_3 P_1}^{v_3}\|}{\|r_{P_2 v_4}^{P_2}\|} \left( \sin(\theta_{v_3}^{p_2}) \omega_{v_2 v_3, y}^{v_3}{}^2 + \cos(\theta_{v_3}^{p_2}) \dot{\omega}_{v_2 v_3, y}^{v_3} \right) + \frac{-\|r_{P_1 P_2}^{P_1}\|}{\|r_{P_2 v_4}^{P_2}\|} \left( \sin(\theta_{P_1}^{p_2}) \omega_{v_2 P_1, y}^{P_1}{}^2 + \cos(\theta_{P_1}^{p_2}) \dot{\omega}_{v_2 P_1, y}^{P_1} \right)$$

Accordingly, the angular acceleration of the implement joint can be described in terms of the geometry of the linkages 320, the angular rates of the linkages and the angular acceleration of the dogbone joint.

The minimum sensor configuration required for dynamic compensation is dependent upon the machine type, the work being performed, and the desired accuracy. A full triad of inclinometers, gyroscopes, and angular accelerometers at each sensing node provides flexibility in system design and may offer advantages in terms of redundant measurements and self-calibration. However, fewer sensors may be desirable for practical and commercial reasons.

Using the excavator 10 as an example, the boom 22, stick 24, dogbone joint 28, and tilt bucket 26 provide only one axis of movement. Therefore, only one gyroscope is necessary per sensing node in order to provide a minimal set of measurements. The remaining two angular rates may be reconstructed from sensors at other locations of the excavator 10.

Using the boom sensor 232 as an example, the observation equation included a term denoting the angular rate of the boom 22 with respect to the navigation frame. Since a minimal configuration will include only an angular rate sensor about the y-axis of the boom frame, the angular rate of the x-axis and y-axis must be reconstructed from the remaining sensors as follows:

$$\omega_{nv_1}^{v_1} = R_{v_0}^{v_1} \omega_{nv_0}^{v_0} + \omega_{v_0 v_1}^{v_1}$$

Since the boom joint co-ordinate frame 220 of an excavator 10 is always parallel to the x-z plane of the chassis co-ordinate frame 200, then the rotation consists of an intrinsic rotation about the y-axis. If the chassis sensor 212 is equipped with angular rate about the x-axis and z-axis then the angular rate of interest may be determined using:

$$\omega_{nv_1}^{v_1} = \begin{bmatrix} \cos(\phi) & 0 & -\sin(\phi) \\ 0 & 1 & 0 \\ \sin(\phi) & 0 & \cos(\phi) \end{bmatrix} \omega_{nv_0}^{v_0} + \begin{bmatrix} 0 \\ \omega_{v_0 v_1, y}^{v_1} \\ 0 \end{bmatrix}$$

If the quantity $\omega_{v_0 v_1}^{v_1}$ is of interest for estimation purposes (e.g. propagating the attitude term $R_{v_0}^{v_1}$), then the inclusion of a y-axis gyroscope on the chassis sensor 212 allows this to be calculated. The necessary configuration and reconstructed angular rates for the remaining sensors (e.g. the stick sensor 252, dogbone sensor 292, and tilt bucket sensor 272) may be determined using a similar procedure.

Ultimately, the accuracy of the angle estimates of each joint is dependent on the quality of the inclinometers. As is known in the industry, one-axis, two-axis, and three-axis configurations are all possible, with benefits and drawbacks associated with each approach.

Although this specification has primarily disclosed inclinometer based acceleration sensors, it will be appreciated that inclinometers may be constructed in a manner which directly measures one or more angles with respect to a local vertical. For example an inclinometer may use a pendulum-type or a spirit level-type construction which directly measures angles but is nonetheless affected by kinematic accelerations.

The simplest means of applying dynamic compensation to angle-based inclinometers is to calculate the equivalent measurement that would be induced on an acceleration-based inclinometer based on the current reading of the angle-based inclinometer and modifying the equivalent measurement in accordance with the specification.

A second means of compensating an angle-based inclinometer is to calculate an angle deviation from the kinematic accelerations which is required to compensate for the angle measurements from the inclinometer. A suitable means to do so is via a Taylor series wherein the angle deviation to apply may be generated by means of the Jacobian of the applicable measurement equation.

In very high precision applications, an inclinometer may comprise of not only the sensing element, but also a mechanical drive such as a stepper motor to align the sensor with a reference orientation to maximise the range and sensitivity of the sensing element. When compensating for kinematic accelerations in such an electro-mechanical sensor, maximum sensitivity is obtained by commanding the mechanical drive to align not with the vertical reference, but instead with the apparent local vertical being the sum of gravity and any kinematic acceleration. Accordingly, when using an electro-mechanical inclinometer, compensating for kinematic effects does not necessarily require the modification of the sensor measurement, but may instead be performed by modifying the sensors itself by, for example, commanding an equivalent reference orientation of the sensor element.

Angular accelerometers are comparatively rare and expensive, but may be useful in certain scenarios where large changes in angular rate are regularly observed. In their absence, the angular acceleration necessary to compensate for Euler acceleration may be either estimated numerically as the derivative of angular rate, or estimated from spatially diverse accelerometers on the same rigid mount. Accordingly, compensation for Euler acceleration is considered a balance of cost and required performance.

On some joints, an angle may be directly measured using an angle encoder or a piston. This is often seen on joints where the axis of rotation is almost parallel to the gravity vector (e.g. grader blades), or on joints which may completely rotate (e.g. rototilt buckets). Since the angle between such joints is directly observable, then there is no need to infer the angle from combined gyroscope and accelerometer measurements.

Although joint angle may be directly observable, the angular rate of a joint will nevertheless induce accelerations further down the kinematic chain. Accordingly, the angular rate must be estimated from the sequence of angular measurements. Given relative angle measurements $R_{v_0}^{v_1(k+1)}$ and $R_{v_0}^{v_1(k)}$ at times k+1 and k respectively, incremental rotation may be calculated as:

$$\Delta R_{v_1}^{v_1(k+1)} = R_{v_0}^{v_1(k+1)} (R_{v_0}^{v_1(k)})^T$$

Under the assumption of constant angular rate over the interval, the angular rate vector may be calculated by inverting the solution to the rotation differential equation, i.e.:

$$\omega_{v_1 v_0}^{v_1} = -\omega_{v_0 v_1}^{v_1} = \frac{1}{\Delta t} \log\left(\Delta R_{v_1(k)}^{v_1(k+1)}\right)$$

A matrix logarithm to of a general rotation matrix R may be calculated, taking due care around the numerical singularities:

$$\theta = \arccos\left(\frac{\text{trace}(R) - 1}{2}\right)$$

$$\omega = \frac{\theta}{2\sin(\theta)} \begin{bmatrix} R_{32} - R_{23} \\ R_{13} - R_{31} \\ R_{21} - R_{12} \end{bmatrix}$$

An estimate of angles between each joint and the attitude of the excavator 10 is required to calculate the position of a working edge, such as the blade of an excavator bucket 26. Various strategies may be used to estimate the angles, with the most suitable typically being selected by balancing required performance against available computational resources.

The simplest strategy for angle estimation involves simply compensating for known kinematic effects on each joint and performing angle estimation on the corrected measurements as would normally be performed on an inclinometer-only solution. For example, coarse levelling would be a suitable algorithm to apply. Using this method is unlikely to be burdensome on computational resources as the additional required computation power over a standard inclinometer solution is marginal.

With the availability of angular rate measurements, significantly greater performance may be achieved by accumulating the angular rate measurements and tending the solution towards the local vertical. This class of algorithm, generally known as an Attitude and Heading Reference System (AHRS), has the distinct advantage of being able to filter a vertical reference whilst maintaining good dynamic performance.

Being able to compensate for kinematic relationships of working equipment such as an excavator 10 removes a significant source of error from the local vertical. Accordingly, more trust can be placed on the vertical reference, allowing a more accurate solution without sacrificing dynamic response.

Alternatively, since the primary means of angle determination in an AHRS algorithm is by integration of angular rate measurements, the algorithm can maintain accuracy for short periods of time without a vertical reference. If the vertical reference is found to be sufficiently corrupted (for example, by kinematic accelerations), then the vertical reference may be ignored rather than compensated during this time.

Many AHRS algorithms are deterministic in their formulation, such as a complementary filter. Another approach to estimating angles is via recursive estimation techniques, such as the families of Kalman Filters, Extended Kalman Filters, Sigma-Point Kalman Filters, Ensemble Kalman filters, and Particle Filters. A recursive estimator usually takes the form of a process model and a measurement model, such as:

$$x(k+1)=f(x(k),u(k),v(k))$$

$$y(k)=h(x(k),w(k))$$

where x(k) is the state vector consisting of the quantities of interest (e.g. angles) and nuisance parameters such as gyroscope bias. Process model f is usually implemented in terms of propagating the gyroscope measurements and the statistics of the nuisance parameters. Measurement model h is formed from an observation model of each sensor, taking into the account the kinematics effects as detailed.

Associated with the state vector is the state covariance which describes an uncertainty (or dispersion) of state vector estimates. Notably, it tracks a correlation between the state vector parameters. Especially in this instance where the observables are part of a kinematic chain, there will be significant correlation between the variables of interest. For example, it is clear that measurements at the stick sensor 252 are dependent on not only the stick 24 angle, but also the boom 22 angle and the attitude of the chassis 20.

This correlation may be exploited to offer a performance gain, especially in context where there are redundant measurements available. It also offers the potential for self-calibration, especially where the nuisance parameters are chosen carefully such as modelling the angular offset of a sensing node with respect to coordinate frame of a movable member.

To demonstrate, consider the case where there are tri-axis inclinometers available at each sensing node. Since an excess of measurements are available at each sensor location, the system of observation equations is over-determined. In certain geometric configurations, or during changes in geometric configuration over time, the correlation between certain states may be reduced. Accordingly, the performance of the system increases. Alternatively, it may be formulated that the correlation between the nuisance parameters, such as biases and angular offsets, and the states of interest be reduced over time though similar changes to the geometric configuration over time. As the correlation is reduced, the uncertainty in the nuisance parameters is also reduced over time, allowing for these to be 'learned' over time. Therefore, such a system may be used either to increase performance or for self-calibration purposes.

The cost of recursive estimation is a greatly increased computational power requirement when compared to an AHRS or enhanced inclinometer solution. Nevertheless, such a filter is considered to be within the capabilities of a modern embedded system.

Advantageously the invention allows for compensation of dynamic movements in sensor measurements resulting in more accurate measurements. Particularly, dynamic accuracy of a machine guidance system is greatly improved by carefully quantifying and compensating for induced accelerations on the measurements caused by working equipment kinematic relationships.

Additionally, periods of inactivity to allow sensors to determine a position while stationary are minimised, or even avoided entirely, which significantly improves operation efficiency. Implementation can be scaled to balance performance with available computational resources to allow it to be applied to a variety of different types of equipment with varying levels of computing resources available.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The invention claimed is:

1. A method of providing compensation for kinematic accelerations influencing a sensor measurement from a sensor of working equipment, the method comprising:
   identifying a plurality of members of the working equipment that are movable relative to each other;

defining a co-ordinate frame for one or more sensors associated with each movable member;

determining kinematic relationships for each co-ordinate frame, including determining a kinematic chain;

determining the relative position including the angle of each identified movable member;

determining the relative movement of each movable member relative to a previous movable member in the kinematic chain; and modifying the sensors or sensor measurements according to the kinematic relationships, relative position, and relative movement of each identified movable member, such that the accelerations induced by all relative movements of the movable members are compensated for.

2. The method of claim 1, wherein the step of modifying the sensor or sensor measurement further comprises modifying the sensor or sensor measurement according to at least one of the group of measured: linear acceleration, angular rate, or angular acceleration.

3. The method of claim 1, wherein the step of determining a kinematic chain comprises successively determining kinematic relationships from a first movable member to a final movable member such that the kinematic relationship for subsequent movable members is dependent upon the kinematic relationship of a previous movable member.

4. The method of claim 1, wherein the step of determining a kinematic chain comprises determining kinematic relationships between a set of mechanically coupled linkages wherein each linkage is connected to a plurality of adjacent linkages.

5. The method of claim 1, wherein the step of modifying the sensor or sensor measurement according to the kinematic relationships and relative position of each identified member comprises utilising a time derivative of the relative position of each identified member.

6. The method of claim 1, wherein the step of modifying the sensor or sensor measurement comprises compensating for one or more of linear acceleration, acceleration with respect to a rotating frame, and fictitious forces.

7. The method of claim 6, wherein accounting for kinematic effects comprises compensating sensor measurements for kinematic accelerations and ignoring sensor measurements when kinematic accelerations are determined to be over a predetermined level.

8. The method of claim 1, wherein the step of modifying the sensor or sensor measurement comprises using measurements from one or more angular rate sensors or one or more angular acceleration sensors.

9. The method of claim 1, wherein the step of modifying the sensor or sensor measurement comprises using measurements from a plurality of sensors attached to spatially diverse locations on a movable member.

10. The method of claim 1, wherein the step of defining a co-ordinate frame for each movable member comprises the step of defining a co-ordinate frame for one or more sensors associated with the movable members.

11. The method of claim 1, wherein the step of modifying the sensor or sensor measurement according to the kinematic relationships and relative position of each identified member further comprises modifying the sensor or sensor measurement according to the one or more sensors associated with the movable member.

12. The method of claim 11, further comprising:

determining a position of a working edge of the working equipment using the modified sensor measurement to determine the position of the working edge; and determining a position of the working edge comprises determining angles between adjacent movable members accounting for kinematic effects.

13. A system that compensates one or more sensor measurements from sensors of working equipment for kinematic accelerations, the system comprising:

working equipment having a plurality of members that are movable relative to each other; and a processor in communication with the sensors that are configured to:

take a sensor measurement;

obtain a co-ordinate frame for one or more sensors associated with each movable member;

obtain a kinematic relationship for each co-ordinate frame including determining a kinematic chain;

determine the relative position including the angle of the movable members;

determine the relative movement of each movable member relative to a previous movable member in the kinematic chain; and modify the sensors or sensor measurements according to the kinematic relationships, relative position, and relative movement of each identified movable member to account and compensate for the kinematic accelerations induced by all relative movements.

14. The system of claim 13, wherein the processor is configured to obtain a stored co-ordinate frame for each movable member.

15. The system of claim 13, wherein the processor is configured to obtain a stored kinematic relationship for each co-ordinate frame.

16. The system of claim 13, wherein the processor is further configured to determine at least one of the group of measured: linear acceleration, angular rate, or angular acceleration; and to modify the sensor or sensor measurement using the determined linear acceleration, angular rate, and/or angular acceleration.

* * * * *